(12) United States Patent
Katahira

(10) Patent No.: US 8,300,325 B2
(45) Date of Patent: Oct. 30, 2012

(54) OBJECTIVE LENS AND ENDOSCOPE USING THE SAME

(75) Inventor: Yuko Katahira, Tokyo (JP)

(73) Assignee: Olympus Medical Systems Corp., Tokyo (JP)

( * ) Notice: Subject to any disclaimer, the term of this patent is extended or adjusted under 35 U.S.C. 154(b) by 0 days.

(21) Appl. No.: 13/252,588

(22) Filed: Oct. 4, 2011

(65) Prior Publication Data

US 2012/0127598 A1    May 24, 2012

Related U.S. Application Data

(63) Continuation of application No. PCT/JP2011/057320, filed on Mar. 25, 2011.

(30) Foreign Application Priority Data

Apr. 7, 2010   (JP) ................................. 2010-088741

(51) Int. Cl.
G02B 9/60   (2006.01)
G02B 9/62   (2006.01)

(52) U.S. Cl. ......... 359/770; 359/752; 359/753; 359/761

(58) Field of Classification Search .......... 359/749–756, 359/761, 763, 770; 600/101–183
See application file for complete search history.

(56) References Cited

U.S. PATENT DOCUMENTS

| 5,587,839 | A | 12/1996 | Miyano et al. |
| 6,956,703 | B2 | 10/2005 | Saito |
| 7,746,572 | B2 * | 6/2010 | Asami ........................... 359/783 |
| 2006/0061880 | A1 * | 3/2006 | Kawakami .................... 359/754 |
| 2008/0198484 | A1 | 8/2008 | Shinohara | |
| 2009/0052061 | A1 | 2/2009 | Asami | |

FOREIGN PATENT DOCUMENTS

JP    3051035 B2    3/2000

(Continued)

OTHER PUBLICATIONS

Decision to Grant a Patent dated Jan. 26, 2012 issued in Japanese Patent Application No. 2011-543398 together with English language translation.

(Continued)

*Primary Examiner* — Darryl J Collins
(74) *Attorney, Agent, or Firm* — Scully, Scott, Murphy & Presser, P.C.

(57) ABSTRACT

Provided is a simple-structured endoscope objective lens suitable for a compact, high-resolution image acquisition element. Provided is an objective lens constituted of a first negative lens, a second positive lens, an aperture stop, a third positive lens, and a joined lens arranged in that order from an object side, the joined lens being formed of a fourth positive lens and a fifth negative lens and satisfying the expressions (1) and (2), and the objective lens satisfies the expression (3):

$$nn \geq 2.0 \quad (1)$$

$$12 < (\nu p - \nu n) < 34 \quad (2)$$

$$1.52 < (f23/fl) < 1.75 \quad (3)$$

where nn, νp, νn, f23 and fl denote a refractive index at d-line of the fifth lens, an Abbe number of the fourth lens, an Abbe number of the fifth lens, a combined focal length of the second lens and the third lens, and a focal length of the entire, respectively.

8 Claims, 25 Drawing Sheets

FOREIGN PATENT DOCUMENTS

| | | | |
|---|---|---|---|
| JP | 2007-249189 | A | 9/2007 |
| JP | 2007-256325 | A | 10/2007 |
| JP | 2007-322655 | A | 12/2007 |
| JP | 2007-333799 | A | 12/2007 |
| JP | 2008-197594 | A | 8/2008 |
| JP | 2008-262704 | A | 10/2008 |
| JP | 4245985 | B2 | 1/2009 |
| JP | 2009-047947 | A | 3/2009 |
| JP | 2011-175234 | | 9/2011 |

OTHER PUBLICATIONS

International Search Report PCT/JP2011/057320 dated May 24, 2011 together with English language translation.

Japanese Patent Application No. JP 2004-354888 published Dec. 12, 2004 abstract only.

Japanese Patent Application No. JP 08-122632 published May 17, 1996 abstract only.

* cited by examiner

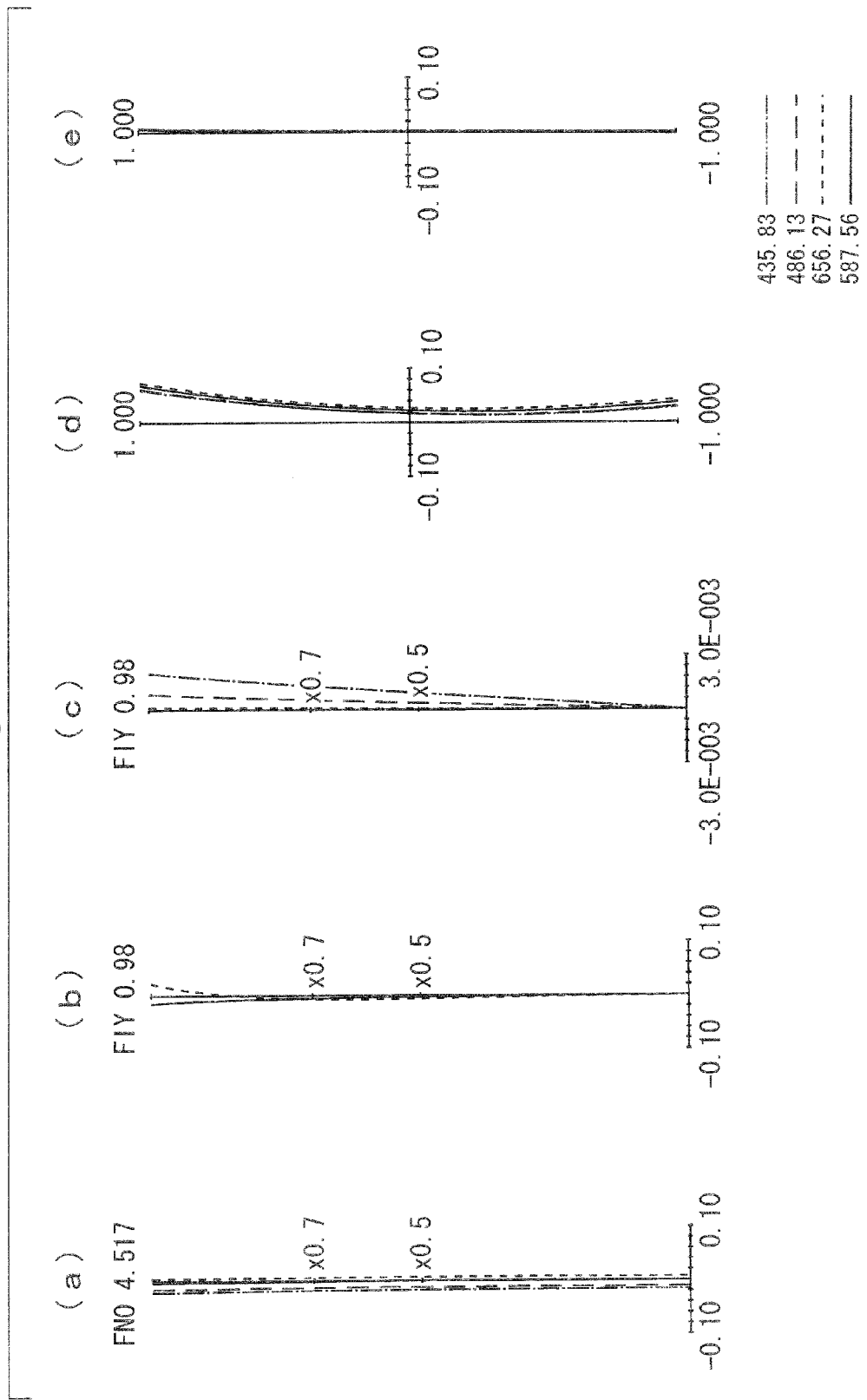

ional filing date of Mar. 25,
OBJECTIVE LENS AND ENDOSCOPE USING THE SAME

CROSS-REFERENCE TO RELATED APPLICATIONS

This is a continuation of International Application PCT/JP2011/057320, with an international filing date of Mar. 25, 2011, which is hereby incorporated by reference herein in its entirety. This application claims the benefit of Japanese Patent Application No. 2010-088741, the content of which is incorporated herein by reference.

BACKGROUND OF THE INVENTION

1. Field of the Invention

The present invention relates to objective lenses and endoscopes using the same.

2. Description of Related Art

With regard to endoscopes used in the medical field, there have been demands to reduce the diameter of insertion sections of the endoscopes and to shorten rigid ends of the insertion sections so as to improve maneuverability and to reduce the load on patients. Therefore, objective lenses mounted in endoscopes need to have a small outer diameter and a short overall length. Furthermore, in order to improve the diagnostic ability of endoscopes, it is important to enhance the image quality by correcting various kinds of optical aberrations. A compact, simple-structured endoscope objective lens corrected for chromatic aberration is known (for example, see Japanese Unexamined Patent Application, Publication No. 2007-249189, U.S. Pat. No. 6,956,703, and U.S. Pat. No. 5,587,839).

BRIEF SUMMARY OF THE INVENTION

A first aspect of the present invention provides an objective lens including a first negative lens, a second positive lens, an aperture stop, a third positive lens, and a joined lens arranged in order from an object side, the joined lens being formed of a fourth positive lens and a fifth negative lens that are joined together. The joined lens satisfies conditional expressions (1) and (2), and the objective lens satisfies conditional expression (3):

$$nn \geq 2.0 \quad (1)$$

$$12 < (vp - vn) < 34 \quad (2)$$

$$1.52 < (f23/fl) < 1.75 \quad (3)$$

where nn denotes a refractive index with respect to a d-line of the fifth lens, vp denotes an Abbe number of the fourth lens, vn denotes an Abbe number of the fifth lens, f23 denotes a combined focal length of the second lens and the third lens, and fl denotes a focal length of the entire.

A second aspect of the present invention provides an endoscope including the aforementioned objective lens.

BRIEF DESCRIPTION OF THE SEVERAL VIEWS OF THE DRAWINGS

FIG. 25 includes aberration diagrams showing various kinds of aberrations of the objective lens in FIG. 24.

DETAILED DESCRIPTION OF THE INVENTION

Figure 1:
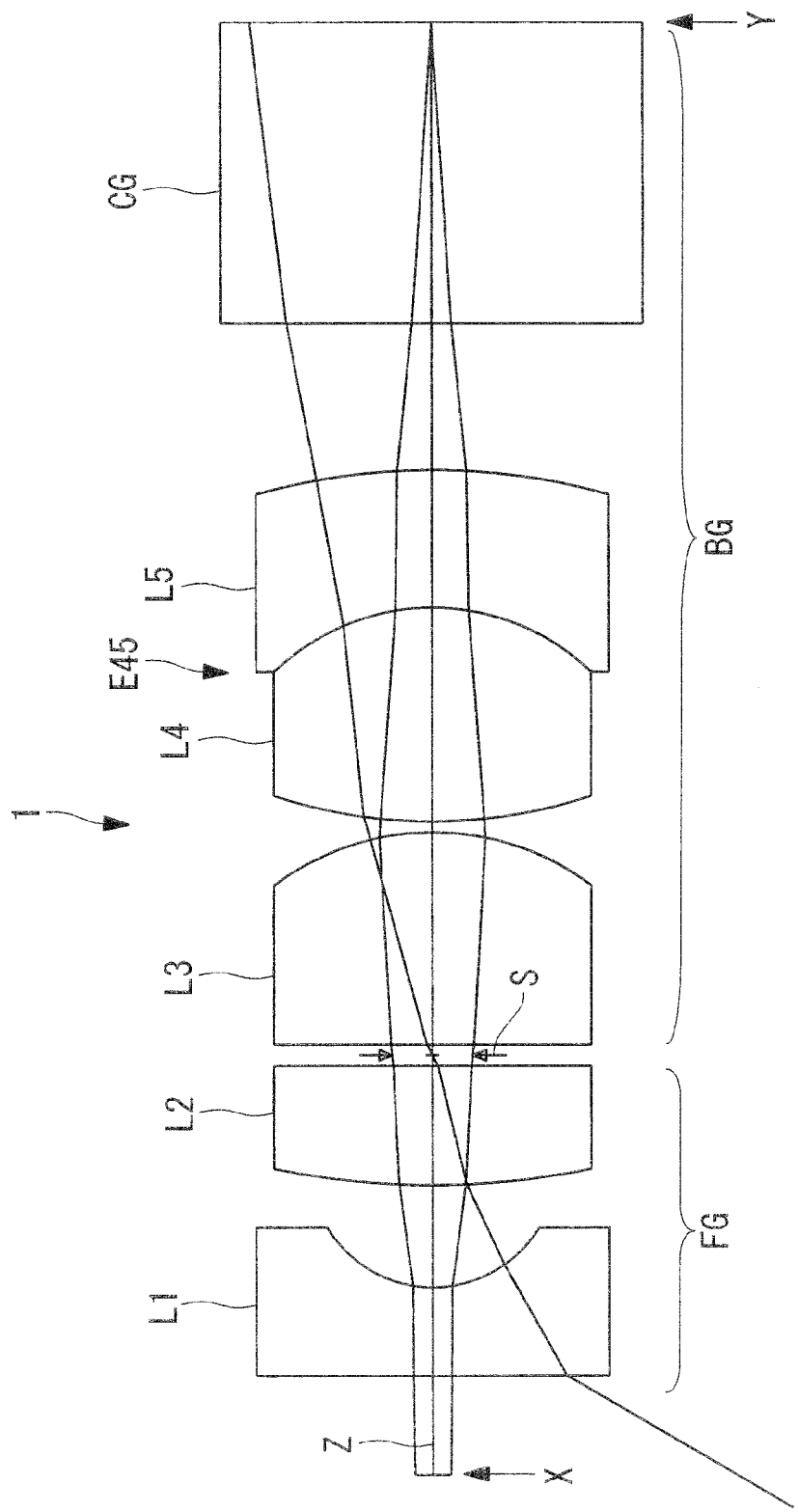
FIG. 1 is a cross-sectional view showing the overall configuration of an objective lens according to an embodiment of the present invention.

An objective lens 1 according to an embodiment of the present invention and an endoscope equipped with the objective lens 1 at a rigid end thereof will be described below with reference to FIG. 1.

The objective lens 1 according to this embodiment is to be mounted within the rigid end serving as a terminal end of an insertion section of the endoscope. As shown in FIG. 1, the objective lens 1 includes a front group FG, an aperture stop S, and a rear group BG arranged in that order from an object side. The front group FG is constituted of a first negative lens L1 and a second positive lens L2 arranged in that order from the object side. The rear group BG is constituted of a third positive lens L3, a joined lens E45 formed of a fourth positive lens L4 and a fifth negative lens L5 that are joined together, and a cover glass CG arranged in that order from the object side.

The joined lens E45 satisfies the following conditional expressions (1) and (2):

$$nn \geq 2.0 \quad (1)$$

$$12 < (vp - vn) < 34 \quad (2)$$

where nn denotes the refractive index with respect to the d-line of the fifth lens L5, vp denotes the Abbe number of the fourth lens L4, and vn denotes the Abbe number of the fifth lens L5.

In the objective lens 1 according to this embodiment, a simple structure is obtained by minimizing the number of optical elements so as to achieve a compact endoscope objective lens with a short overall optical length.

Conditional expression (1) defines the refractive index of the negative lens L5 included in the joined lens E45. In a case where chromatic aberration is to be corrected, a negative lens in a positive group is preferably composed of a material with a high refractive index. By disposing a negative lens L5 composed of a high-refractive-index material in a rear group BG located behind the aperture stop S, transverse chromatic aberration can be satisfactorily corrected. Furthermore, the use of a high-refractive-index material for the negative lens L5 of the joined lens E45 in this manner allows for an increased thickness of the negative lens L5, thereby achieving good lens processability.

Furthermore, by using a high-refractive-index lens as the fifth lens L5, the aberration correcting ability of the rear group BG disposed at the rear side of the aperture stop S is improved in the entire objective lens system 1, thereby increasing the options for the glass material that can be used as the first lens L1. If the value deviates from the range of conditional expression (1), it becomes difficult to correct chromatic aberration in the entire system, and the lens processability is lowered.

Conditional expression (2) defines a difference between the Abbe numbers of the positive lens L4 and the negative lens L5 of the joined lens E45. The use of a material with a low Abbe number for the negative lens L5 in the positive group allows for correction of chromatic aberration and correction of field curvature. Furthermore, the radius of curvature of the joint surface between the positive lens L4 and the negative lens L5 of the joined lens E45 can be increased, thereby improving the lens processability.

If the value falls below the lower limit of 12 in conditional expression (2), the Abbe number of the positive lens L4 in the joined lens E45 becomes smaller or the Abbe number of the negative lens L5 becomes larger. Therefore, correction of chromatic aberration tends to become difficult. On the other hand, if the value exceeds the upper limit of 34 in conditional expression (2), the difference between the Abbe numbers of the positive lens L4 and the negative lens L5 in the joined lens E45 becomes larger, particularly causing a large amount of light dispersion to occur at the negative lens L5. This tends to cause the transverse chromatic aberration (in particular, the difference between the g-line and d-line) to become large. In order to correct such a large transverse chromatic aberration, the radius of curvature of the negative lens L5 needs to be reduced, resulting in lower processability.

Furthermore, the objective lens 1 satisfies conditional expression (3):

$$1.52 < (f23/fl) < 1.75 \quad (3)$$

where f23 denotes a combined focal length of the second lens and the third lens, and fl denotes a focal length of the entire system.

Conditional expression (3) defines the combined focal length f23 of the second lens L2 and the third lens L3 disposed in front of and behind the aperture stop S. In order to reduce the overall length and the size of the objective lens 1 and to minimize the variation in the angle of incidence on the image surface, it is necessary to bend a light beam by using a small number of lenses. With regard to lens processability and assembly accuracy, it is desirable that the radii of curvature of the lenses be larger than or equal to a certain value. Therefore, it is necessary to achieve a balance in the focal lengths of the second lens L2 and the third lens L3 and the radii of curvature of the image-side surfaces thereof.

If the value falls below the lower limit of 1.52 in conditional expression (3), the refractive index of the second lens L2 would need to be increased and the refractive index of the third lens L3 would need to be reduced so as to correct the aberrations in the entire system in a well-balanced manner. This would result in reduced options for the glass material that can be used for correcting the aberrations in the entire system. On the other hand, if the value exceeds the upper limit of 1.75 in conditional expression (3), the refractive indices of the second and third lenses L2, L3 would need to be increased, and the radius of curvature of the image-side surface of the third lens L3 would need to be reduced. This would result in reduced options for the glass material that can be used for correcting the aberrations in the entire system, resulting in lower processability of the third lens L3.

The third lens L3 is a plano-convex lens with the flat surface thereof disposed facing the object. The third lens L3 satisfies the following conditional expression (6):

$$(R3b + R3a)/(R3b - R3a) \geq -1.0 \quad (6)$$

where R3a denotes the radius of curvature of the object-facing surface of the third lens L3, and R3b denotes the radius of curvature of an image-side surface of the third lens L3.

Conditional expression (6) defines that the third lens is a biconvex lens or a plano-convex lens. Therefore, even when the third lens L3 has a small diameter, the lens surface can be readily polished, thereby achieving reduced manufacturing costs. Furthermore, by using a biconvex lens or a plano-convex lens as the third lens L3, the angle of an off-axis light beam can be reduced, thereby improving the ability to correct coma aberration. In particular, in the case where the object-side surface of the third lens L3 is a flat surface, the aperture stop S disposed at the object side thereof can be assembled without any deformation, thereby achieving reduced assembly costs. If the value falls below the lower limit of −1 in conditional expression (6), the radius of curvature of the third lens L3 becomes smaller, making it difficult to polish the lens surface thereof and to correct coma aberration.

Among the first to fifth lenses L1 to L5, at least the first lens L1 is composed of a glass material with a high tolerance to sterilization and a high tolerance to chemicals, such as sapphire, zirconia, yttrium-stabilized zirconia, synthetic quartz, light-transmissive YAG, or spinel, so as to tolerate cleaning and sterilization using high-pressure steam sterilizers and chemicals.

Accordingly, in this embodiment, the fifth negative lens L5 having a high refractive index and a low Abbe number is disposed in the front positive group FG so that transverse chromatic aberration can be effectively corrected. In addition, since the curvature of the fifth lens L5 can be reduced, the fourth lens L4 and the fifth lens L5 can be readily processed, thereby reducing the manufacturing costs.

Furthermore, even with the curvature of the joint surface of the joined lens E45 being reduced in this manner, the focal length to the image surface is shortened so that the overall length of the objective lens 1 in the direction of an optical axis Z can be relatively reduced. Moreover, the overall length of the rigid end of the endoscope is shortened, thereby reducing the load on a living organism into which the endoscope is to be inserted, as well as improving the maneuverability of the rigid end.

In the above embodiment, at least one of the first lens L1 and the second lens L2 may be composed of a material having a high refractive index with respect to a d-line of 2.0 or higher.

In the case where the first lens L1 has a refractive index of 2.0 or higher, the curvature of the concave surface thereof can be reduced while maintaining the field angle. Because the first lens L1 is the terminal-end lens to be in contact with the outside environment and requires a certain strength, a rigid material is often selected therefor. Even when such a rigid glass material is selected, the lens surface can be readily polished, thereby achieving reduced manufacturing costs. In addition, axial chromatic aberration can be satisfactorily corrected. If the curvature of the concave surface is set equal to that in the related art, the field angle can be increased. An example of a glass material with a refractive index of 2.0 or higher and having a high tolerance to sterilization and a high tolerance to chemicals is zirconia.

In the case where the second lens L2 has a refractive index of 2.0 or higher, the focal length of the second lens L2 is shortened, whereby transverse chromatic aberration of the entire system of the objective lens 1 can be reduced.

Furthermore, in the above embodiment, at least one positive lens may be disposed at the rear side of the joined lens E45.

By disposing a lens having a positive refractive index in the vicinity of the image surface in this manner, the angle of incidence of a light beam on the image surface can be corrected so as to be made parallel to the optical axis Z, thereby further correcting the field curvature.

Furthermore, although an image is formed on the optical axis Z at a position behind the fifth lens L5 in the above embodiment, an optical-path changing element, such as a prism that changes the optical path by 90°, may alternatively be disposed at the rear side of the fifth lens L5 so that an image is formed at a position to the side of the optical axis Z of the objective lens 1.

Accordingly, for example, even when the objective lens 1 is to be used in combination with an image acquisition element having a large image acquisition surface, the outer diameter of the rigid end can be reduced by disposing the image acquisition element parallel to the optical axis Z of the objective lens 1. The conversion direction of the optical-path is not restricted to 90° and can be changed suitably.

EXAMPLES

Next, first to twelfth examples of the objective lens according to the above-described embodiment will be described below with reference to FIGS. 2 to 25. In lens data to be described below, r denotes a radius of curvature, d denotes a distance between surfaces, nd denotes a refractive index and ν denotes a Abbe number, and the radius of curvature and the distances between surfaces are in units of millimeters, and the refractive index is the value at the d-line. Furthermore, in reference cross-sectional views of lenses, reference character r denotes a radius of curvature, d denotes a distance between surfaces, a number given as a suffix to each of r and d denotes a surface number, an arrow X denotes an object surface, and an arrow Y denotes an image surface. Moreover, with regard to reference aberration diagrams, diagram (a) illustrates spherical aberration, diagram (b) illustrates astigmatism, diagram (c) illustrates transverse chromatic aberration, diagram (d) illustrates coma aberration in a meridional (M) direction, and diagram (e) illustrates coma aberration in a sagittal (S) direction.

First Example

Figure 2:
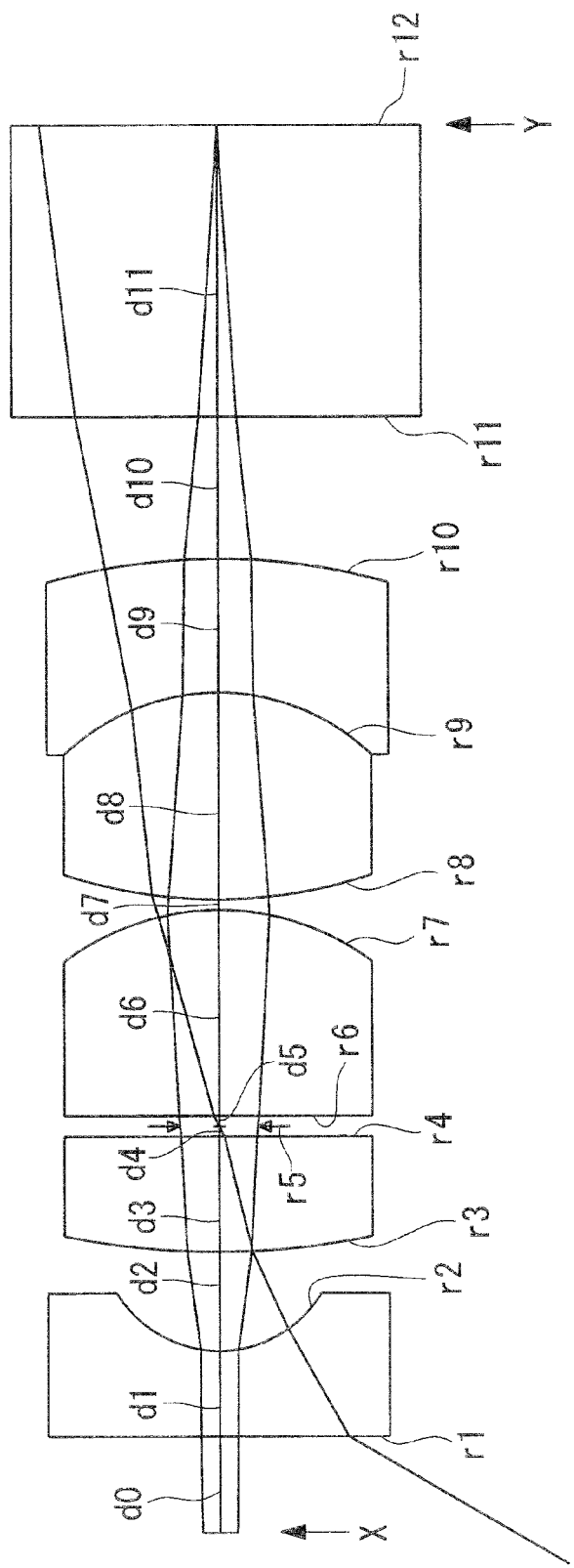
FIG. 2 is a cross-sectional view showing an objective lens according to a first example.
Figure 3:
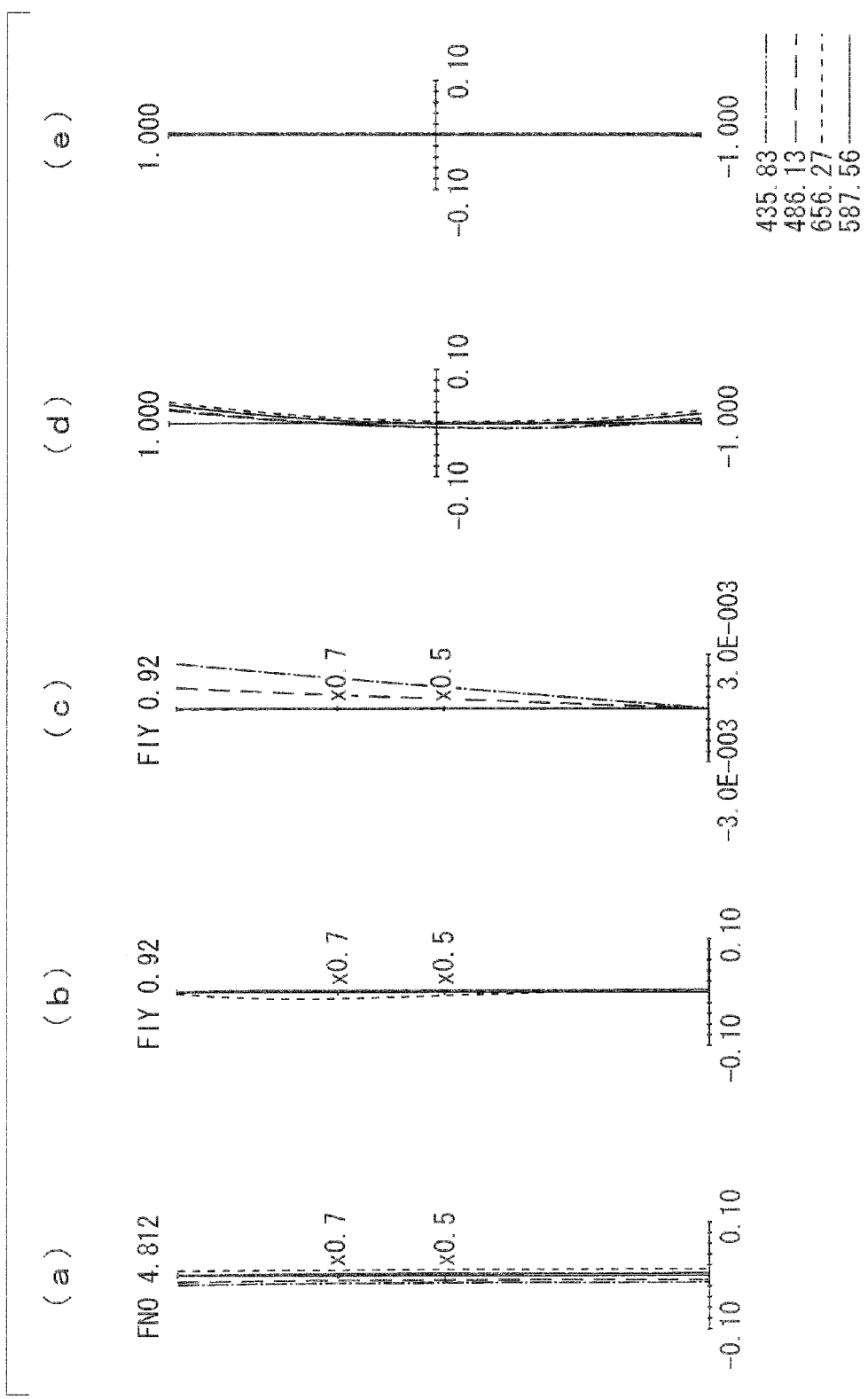
FIG. 3 includes aberration diagrams showing various kinds of aberrations of the objective lens in FIG. 2.

As shown in FIG. 2, an objective lens according to a first example uses a plano-concave lens serving as a first lens and whose flat surface faces toward an object, a plano-convex lens serving as a second lens and whose flat surface faces toward the image surface, a plano-convex lens serving as a third lens and whose flat surface faces toward the object, a biconvex lens serving as a fourth lens, and a concave meniscus lens serving as a fifth lens and whose concave surface faces toward the object. Lens data of the objective lens according to the first example is shown below. Furthermore, FIG. 3 illustrates various aberration diagrams of the objective lens according to this example having the above-described configuration.

Lens Data

| Surface No. | r | d | nd | ν |
|---|---|---|---|---|
| Object Surface | ∞ | 10.128 | 1.000 | |
| 1 | ∞ | 0.444 | 1.768 | 72.23 |
| 2 | 0.6240 | 0.513 | 1.000 | |
| 3 | 3.9849 | 0.599 | 1.923 | 18.90 |
| 4 | ∞ | 0.053 | 1.000 | |
| Stop | ∞ | 0.053 | 1.000 | |
| 6 | ∞ | 1.069 | 1.729 | 54.68 |
| 7 | −1.3363 | 0.053 | 1.000 | |
| 8 | 2.5462 | 1.069 | 1.729 | 54.68 |
| 9 | −1.1586 | 0.688 | 2.317 | 22.40 |
| 10 | −3.3144 | 0.731 | 1.000 | |
| 11 | ∞ | 1.486 | 1.516 | 64.14 |
| 12 | ∞ | 0.000 | 1.000 | |
| Image Surface | ∞ | 0.000 | | |

Second Example

Figure 4:
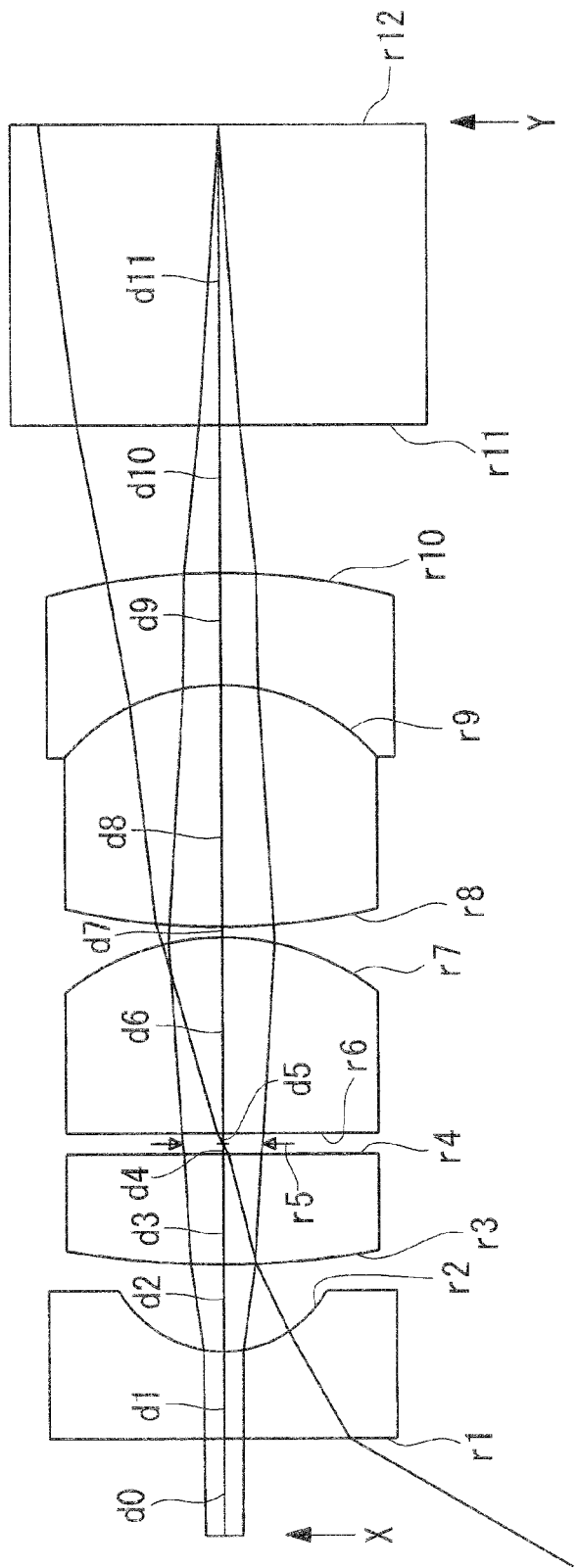
FIG. 4 is a cross-sectional view showing an objective lens according to a second example.
Figure 5:
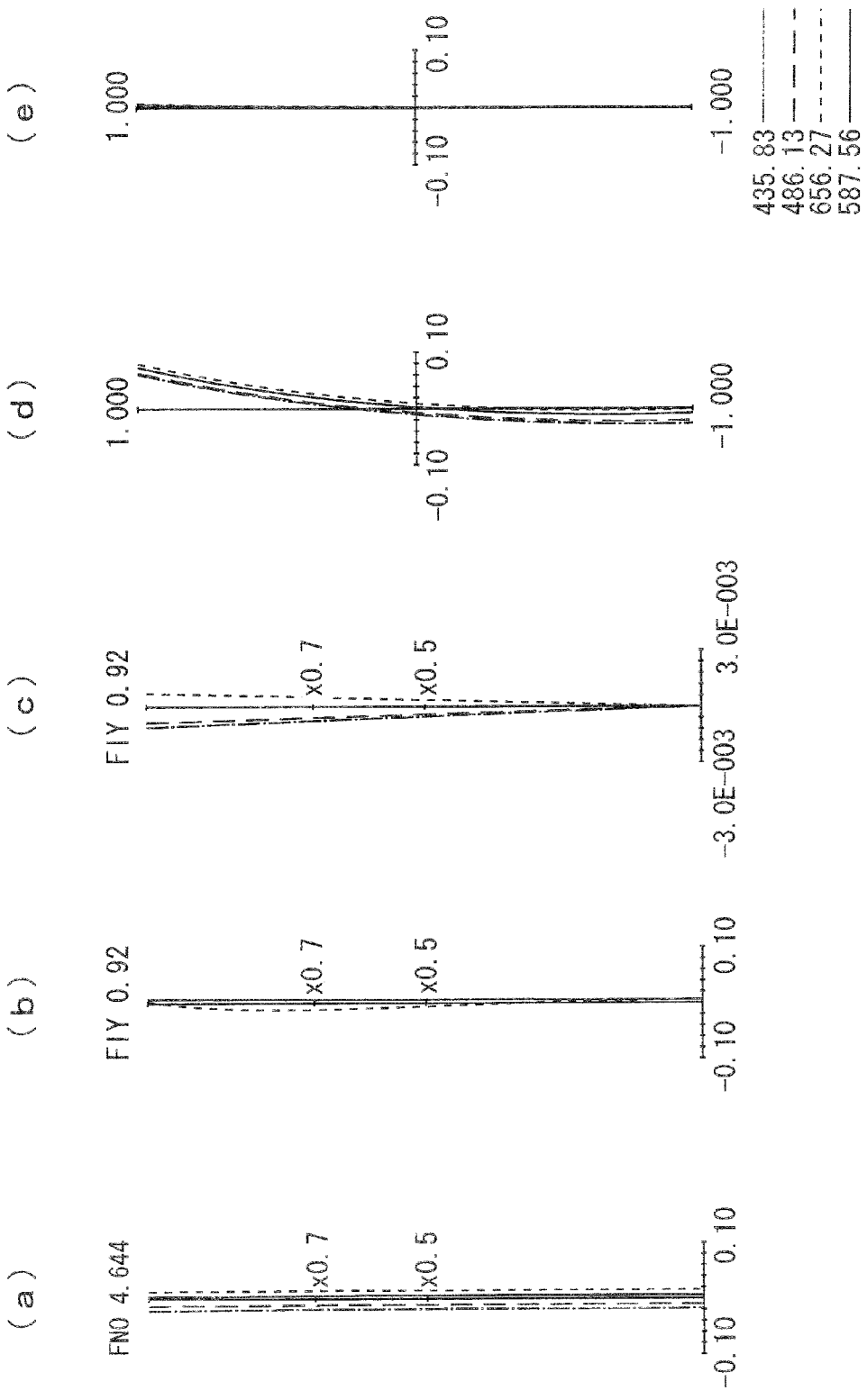
FIG. 5 includes aberration diagrams showing various kinds of aberrations of the objective lens in FIG. 4.

As shown in FIG. 4, an objective lens according to a second example has a configuration similar to that of the objective lens according to the first example. Lens data of the objective lens according to this example is shown below. FIG. 5 illustrates various aberration diagrams of the objective lens according to this example having the above-described configuration.

Lens Data

| Surface No. | r | d | nd | ν |
|---|---|---|---|---|
| Object Surface | ∞ | 10.167 | 1.000 | |
| 1 | ∞ | 0.446 | 1.768 | 72.23 |
| 2 | 0.6144 | 0.445 | 1.000 | |
| 3 | 4.6085 | 0.566 | 1.923 | 18.90 |
| 4 | ∞ | 0.054 | 1.000 | |
| Stop | ∞ | 0.054 | 1.000 | |
| 6 | ∞ | 1.004 | 1.729 | 54.68 |
| 7 | −1.2873 | 0.054 | 1.000 | |
| 8 | 3.5395 | 1.231 | 1.883 | 40.76 |
| 9 | −1.0609 | 0.573 | 2.317 | 22.40 |
| 10 | −3.4200 | 0.752 | 1.000 | |
| 11 | ∞ | 1.509 | 1.516 | 64.14 |
| 12 | ∞ | 0.000 | 1.000 | |
| Image Surface | ∞ | 0.000 | | |

Third Example

Figure 6:
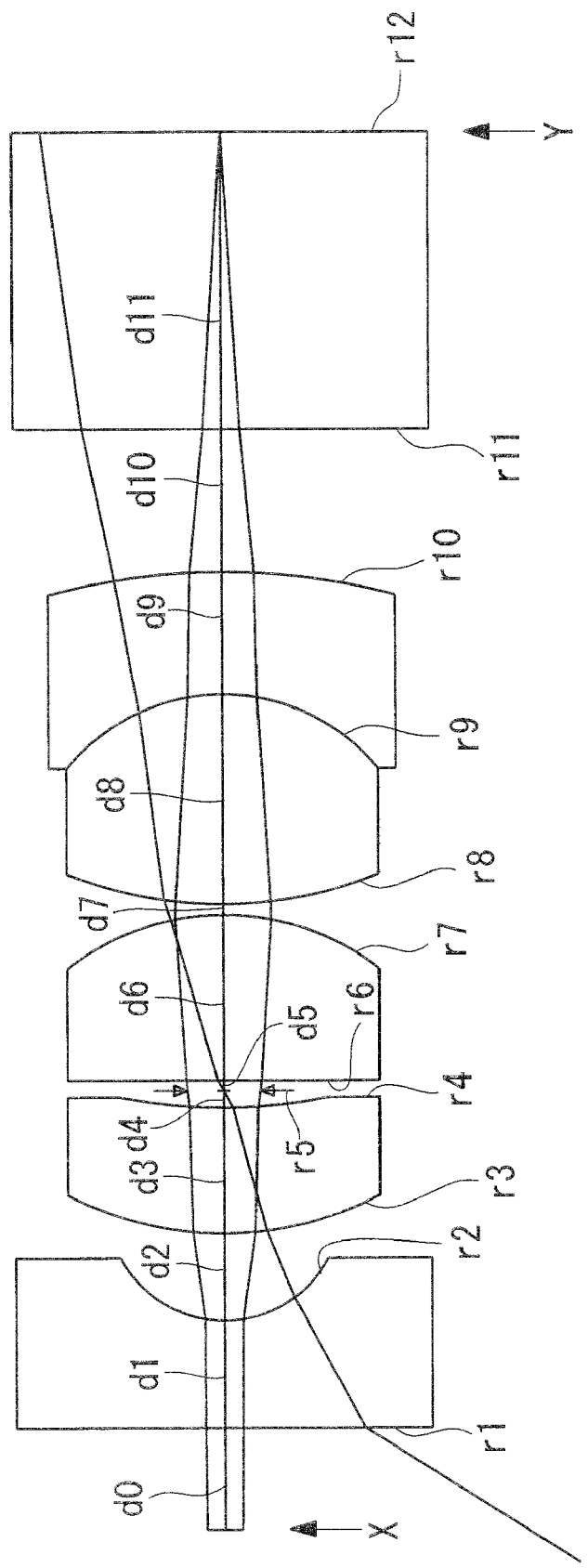
FIG. 6 is a cross-sectional view showing an objective lens according to a third example.
Figure 7:
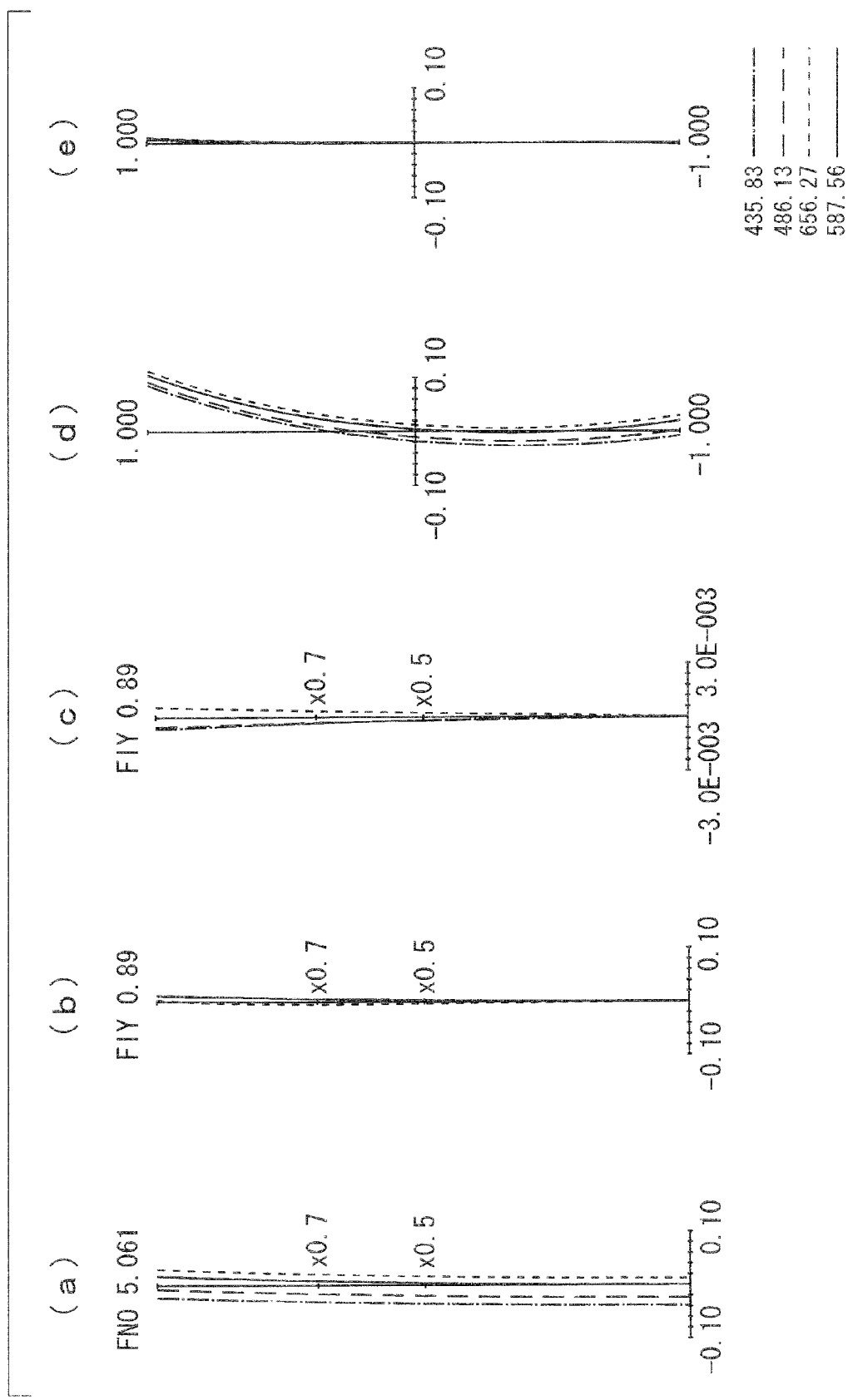
FIG. 7 includes aberration diagrams showing various kinds of aberrations of the objective lens in FIG. 6.

As shown in FIG. 6, an objective lens according to a third example has a configuration similar to that of the objective lens according to the first example. Lens data of the objective lens according to this example is shown below. FIG. 7 illustrates various aberration diagrams of the objective lens according to this example having the above-described configuration.

| Lens Data | | | | |
|---|---|---|---|---|
| Surface No. | r | d | nd | ν |
| Object Surface | ∞ | 9.756 | 1.000 | |
| 1 | ∞ | 0.527 | 1.768 | 72.23 |
| 2 | 0.5824 | 0.427 | 1.000 | |
| 3 | 1.6676 | 0.617 | 1.923 | 18.90 |
| 4 | 2.5387 | 0.086 | 1.000 | |
| Stop | ∞ | 0.051 | 1.000 | |
| 6 | ∞ | 0.812 | 1.729 | 54.68 |
| 7 | −1.2546 | 0.051 | 1.000 | |
| 8 | 2.0821 | 1.023 | 1.729 | 54.68 |
| 9 | −1.0007 | 0.596 | 2.100 | 30.00 |
| 10 | −3.3573 | 0.697 | 1.000 | |
| 11 | ∞ | 1.431 | 1.516 | 64.14 |
| 12 | ∞ | 0.000 | 1.000 | |
| Image Surface | ∞ | 0.000 | | |

Fourth Example

Figure 8:
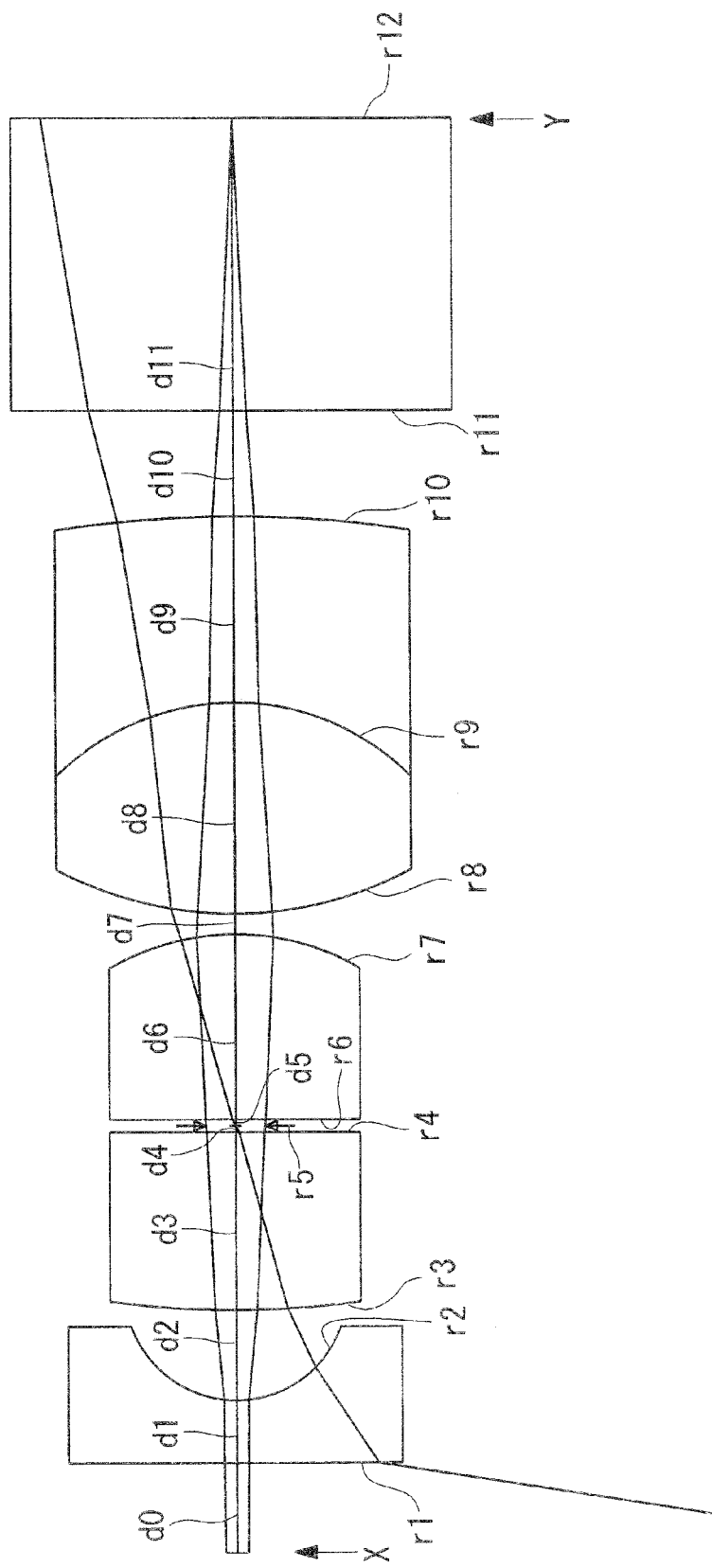
FIG. 8 is a cross-sectional view showing an objective lens according to a fourth example.
Figure 9:
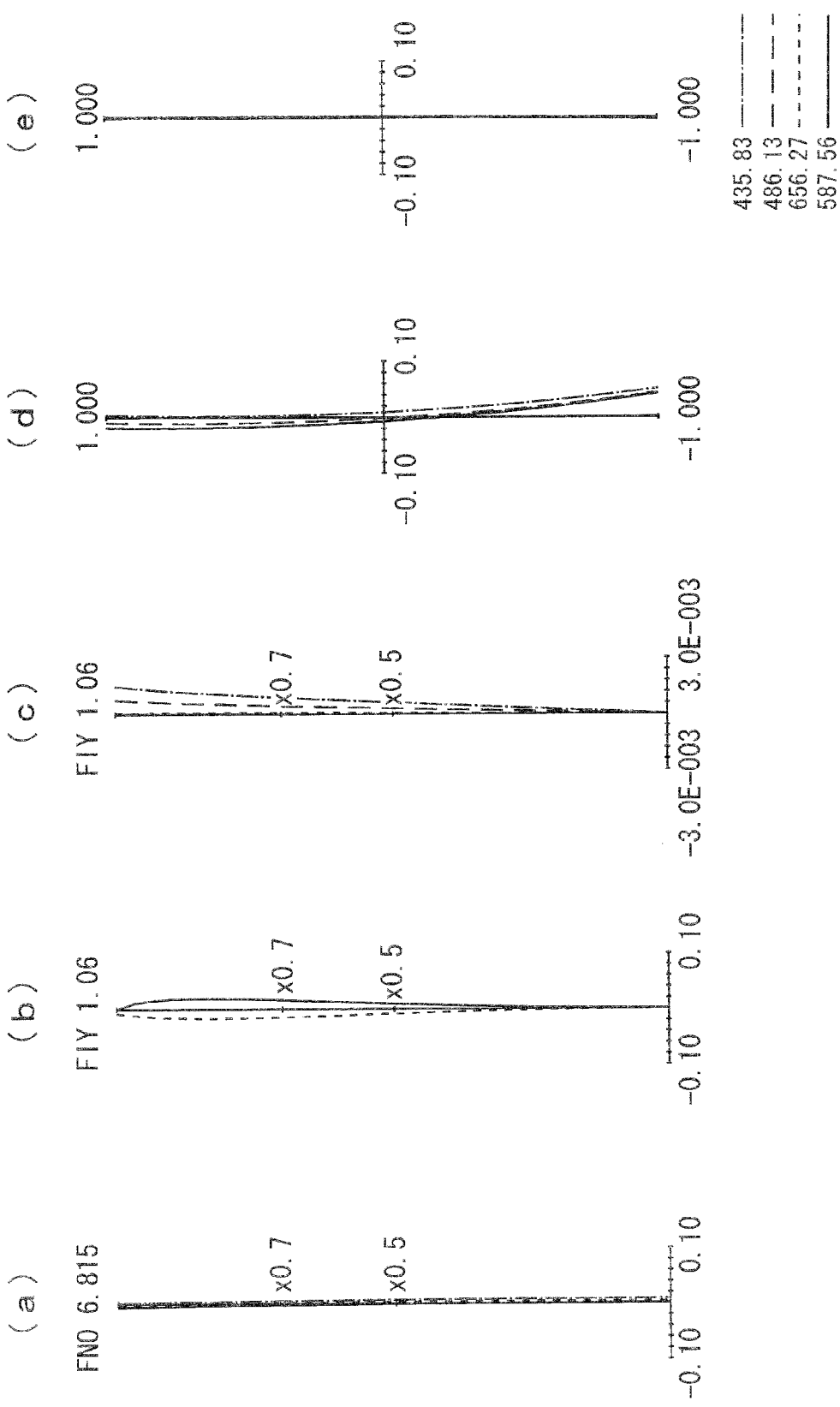
FIG. 9 includes aberration diagrams showing various kinds of aberrations of the objective lens in FIG. 8.

As shown in FIG. 8, an objective lens according to a fourth example has a configuration similar to that of the objective lens according to the first example. Lens data of the objective lens according to this example is shown below. FIG. 9 illustrates various aberration diagrams of the objective lens according to this example having the above-described configuration.

| Lens Data | | | | |
|---|---|---|---|---|
| Surface No. | r | d | nd | ν |
| Object Surface | ∞ | 7.466 | 1.000 | |
| 1 | ∞ | 0.350 | 1.768 | 72.23 |
| 2 | 0.6203 | 0.502 | 1.000 | |
| 3 | 5.2669 | 0.989 | 1.762 | 26.52 |
| 4 | ∞ | 0.035 | 1.000 | |
| Stop | ∞ | 0.035 | 1.000 | |
| 6 | ∞ | 1.031 | 1.729 | 54.68 |
| 7 | −1.3807 | 0.115 | 1.000 | |
| 8 | 2.1475 | 1.166 | 1.729 | 54.68 |
| 9 | −1.4072 | 1.030 | 2.317 | 22.40 |
| 10 | −6.4805 | 0.581 | 1.000 | |
| 11 | ∞ | 1.596 | 1.516 | 64.14 |
| 12 | ∞ | 0.000 | 1.000 | |
| Image Surface | ∞ | 0.000 | | |

Fifth Example

Figure 10:
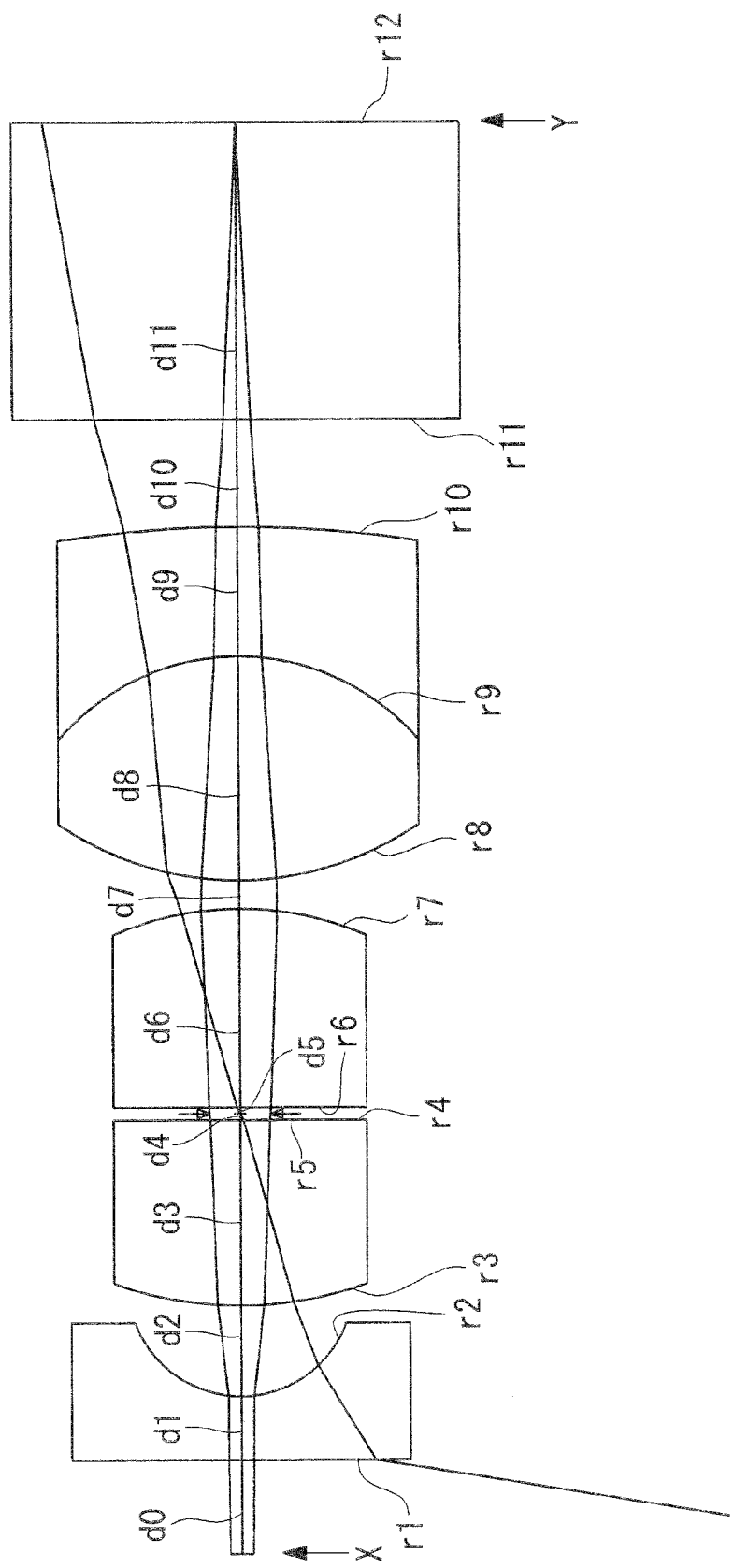
FIG. 10 is a cross-sectional view showing an objective lens according to a fifth example.
Figure 11:
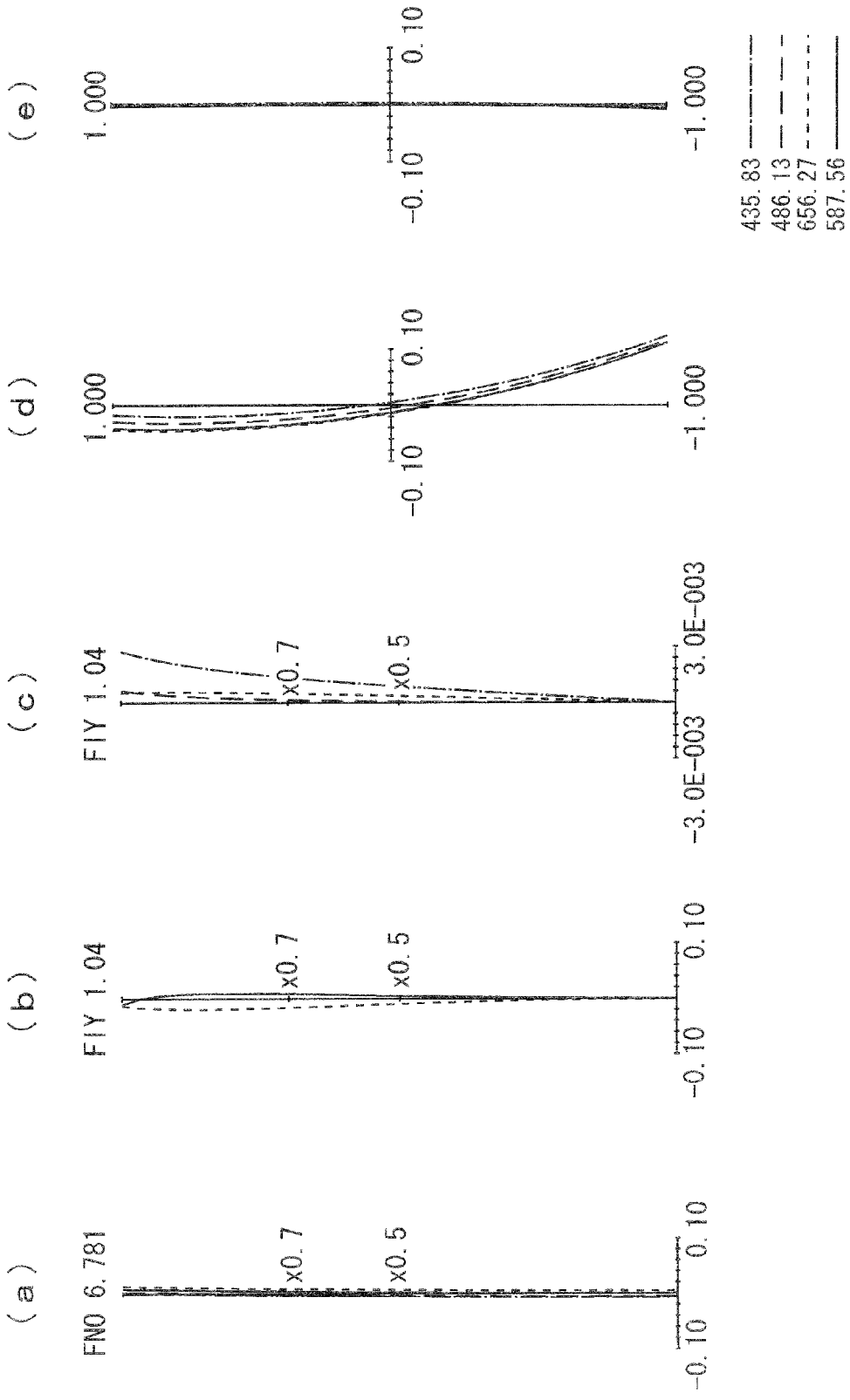
FIG. 11 includes aberration diagrams showing various kinds of aberrations of the objective lens in FIG. 10.

As shown in FIG. 10, an objective lens according to a fifth example has a configuration similar to that of the objective lens according to the first example. Lens data of the objective lens according to this example is shown below. FIG. 11 illustrates various aberration diagrams of the objective lens according to this example having the above-described configuration.

| Lens Data | | | | |
|---|---|---|---|---|
| Surface No. | r | d | nd | ν |
| Object Surface | ∞ | 7.268 | 1.000 | |
| 1 | ∞ | 0.341 | 1.883 | 40.76 |
| 2 | 0.6078 | 0.484 | 1.000 | |
| 3 | 2.0572 | 0.988 | 1.762 | 26.52 |
| 4 | ∞ | 0.034 | 1.000 | |
| Stop | ∞ | 0.034 | 1.000 | |
| 6 | ∞ | 1.061 | 1.729 | 54.68 |
| 7 | −1.7212 | 0.152 | 1.000 | |
| 8 | 1.7204 | 1.186 | 1.729 | 54.68 |
| 9 | −1.2791 | 0.688 | 2.317 | 22.40 |
| 10 | −6.3875 | 0.569 | 1.000 | |
| 11 | ∞ | 1.554 | 1.516 | 64.14 |
| 12 | ∞ | 0.000 | 1.000 | |
| Image Surface | ∞ | 0.000 | | |

Sixth Example

Figure 12:
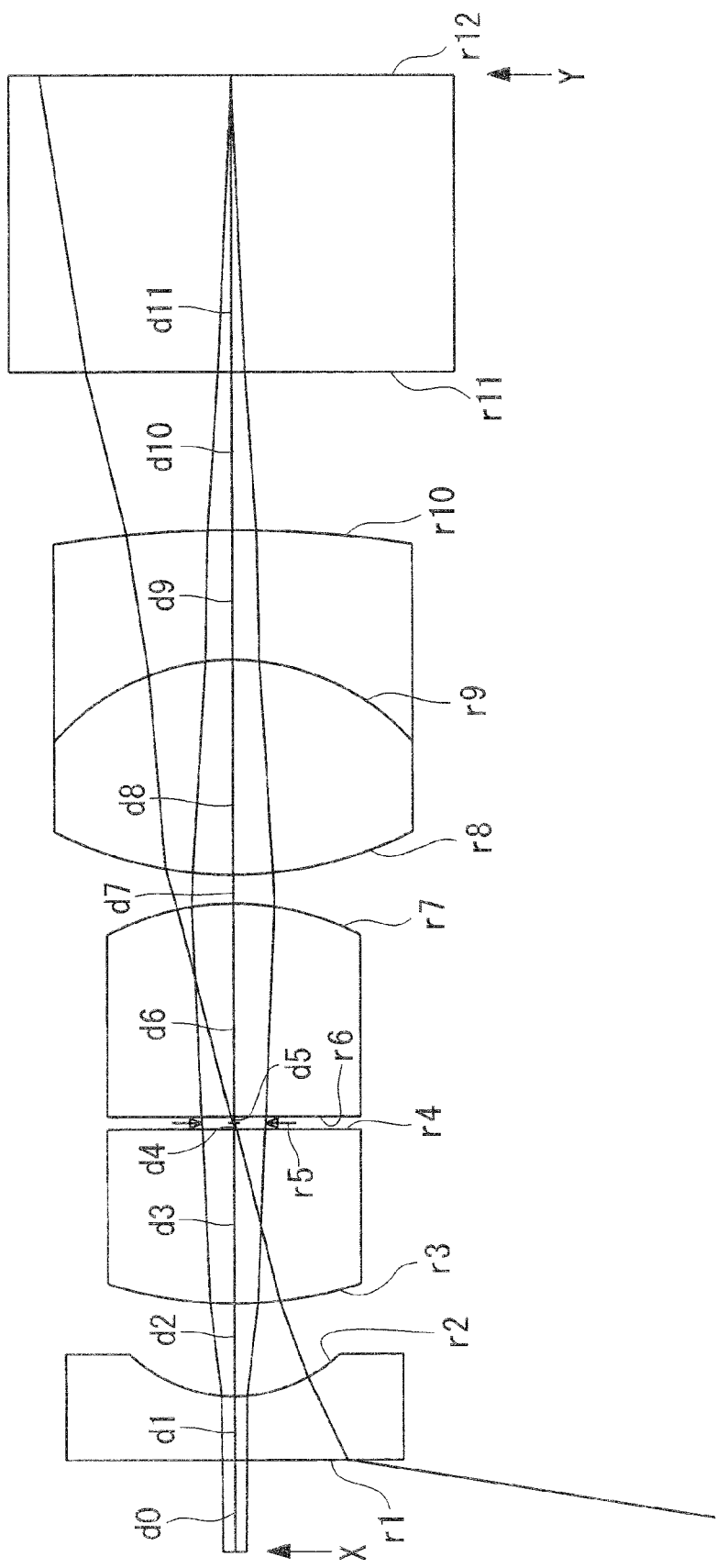
FIG. 12 is a cross-sectional view showing an objective lens according to a sixth example.
Figure 13:
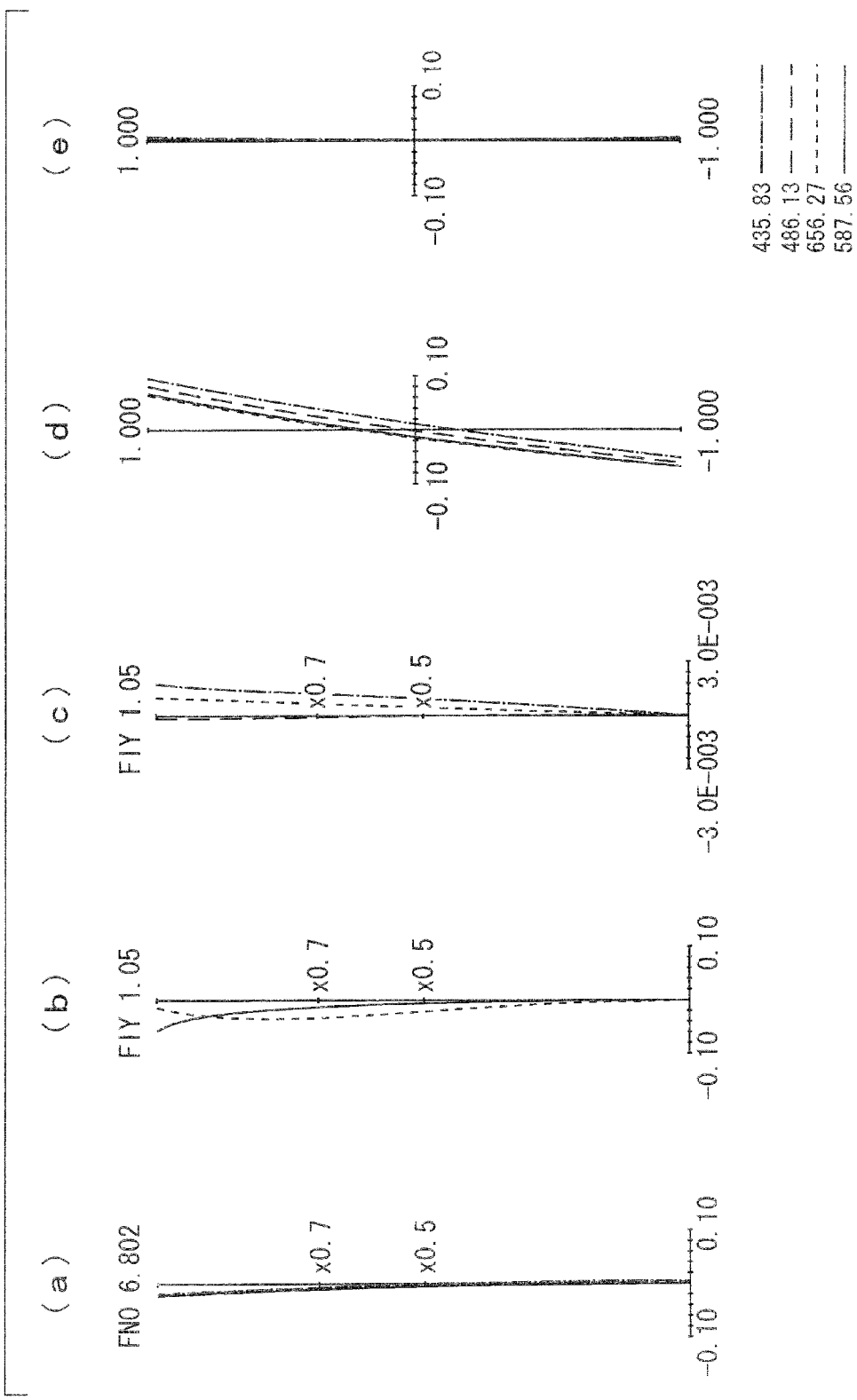
FIG. 13 includes aberration diagrams showing various kinds of aberrations of the objective lens in FIG. 12.

As shown in FIG. 12, an objective lens according to a sixth example has a configuration similar to that of the objective lens according to the first example. Lens data of the objective lens according to this example is shown below. FIG. 13 illustrates various aberration diagrams of the objective lens according to this example having the above-described configuration.

| Lens Data | | | | |
|---|---|---|---|---|
| Surface No. | r | d | nd | ν |
| Object Surface | ∞ | 7.372 | 1.000 | |
| 1 | ∞ | 0.346 | 2.317 | 40.00 |
| 2 | 0.8337 | 0.504 | 1.000 | |
| 3 | 2.2900 | 0.943 | 1.762 | 26.52 |
| 4 | ∞ | 0.035 | 1.000 | |
| Stop | ∞ | 0.035 | 1.000 | |
| 6 | ∞ | 1.155 | 1.729 | 54.68 |
| 7 | −1.4779 | 0.156 | 1.000 | |
| 8 | 2.1724 | 1.157 | 1.729 | 54.68 |
| 9 | −1.3066 | 0.700 | 2.317 | 22.40 |
| 10 | −6.3903 | 0.849 | 1.000 | |
| 11 | ∞ | 1.576 | 1.516 | 64.14 |
| 12 | ∞ | 0.000 | 1.000 | |
| Image Surface | ∞ | 0.000 | | |

Seventh Example

Figure 14:
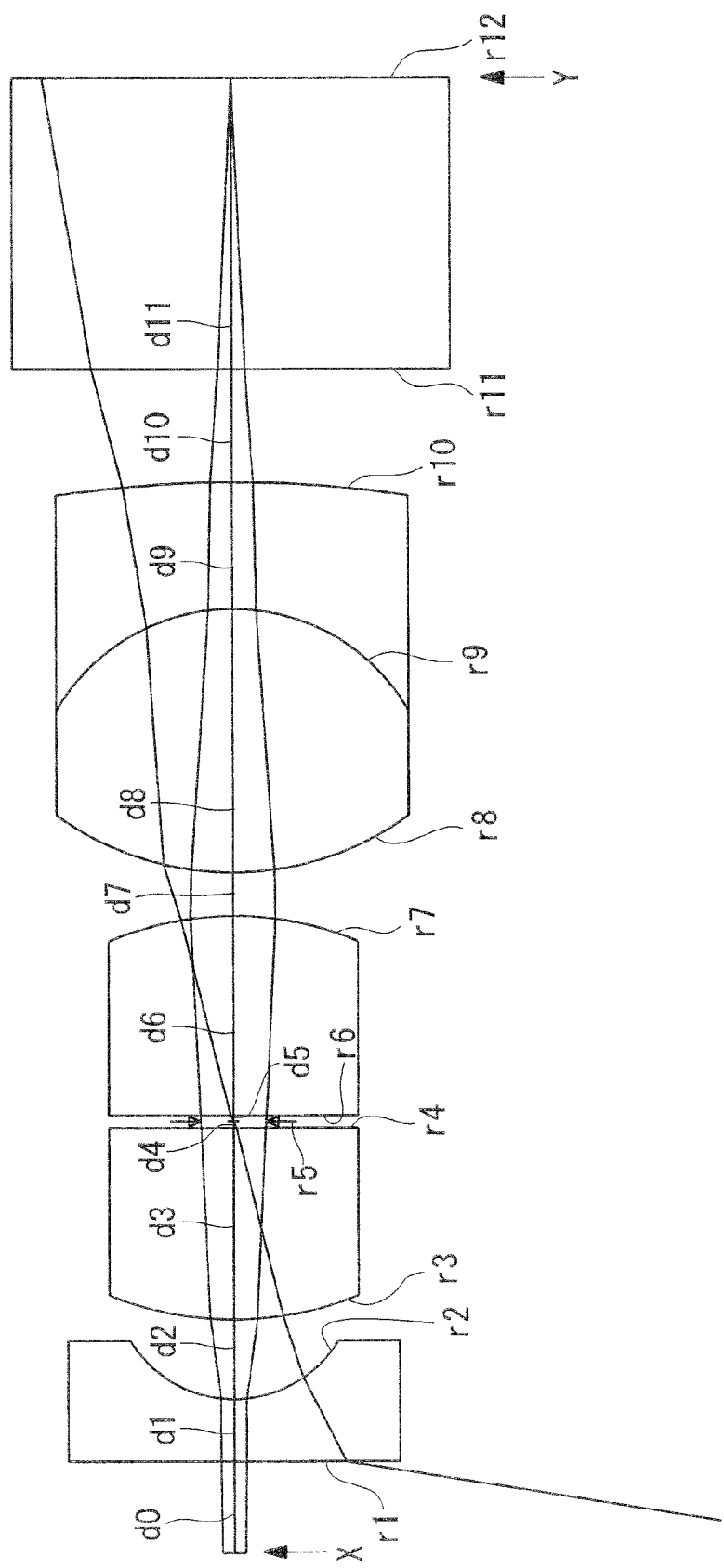
FIG. 14 is a cross-sectional view showing an objective lens according to a seventh example.
Figure 15:
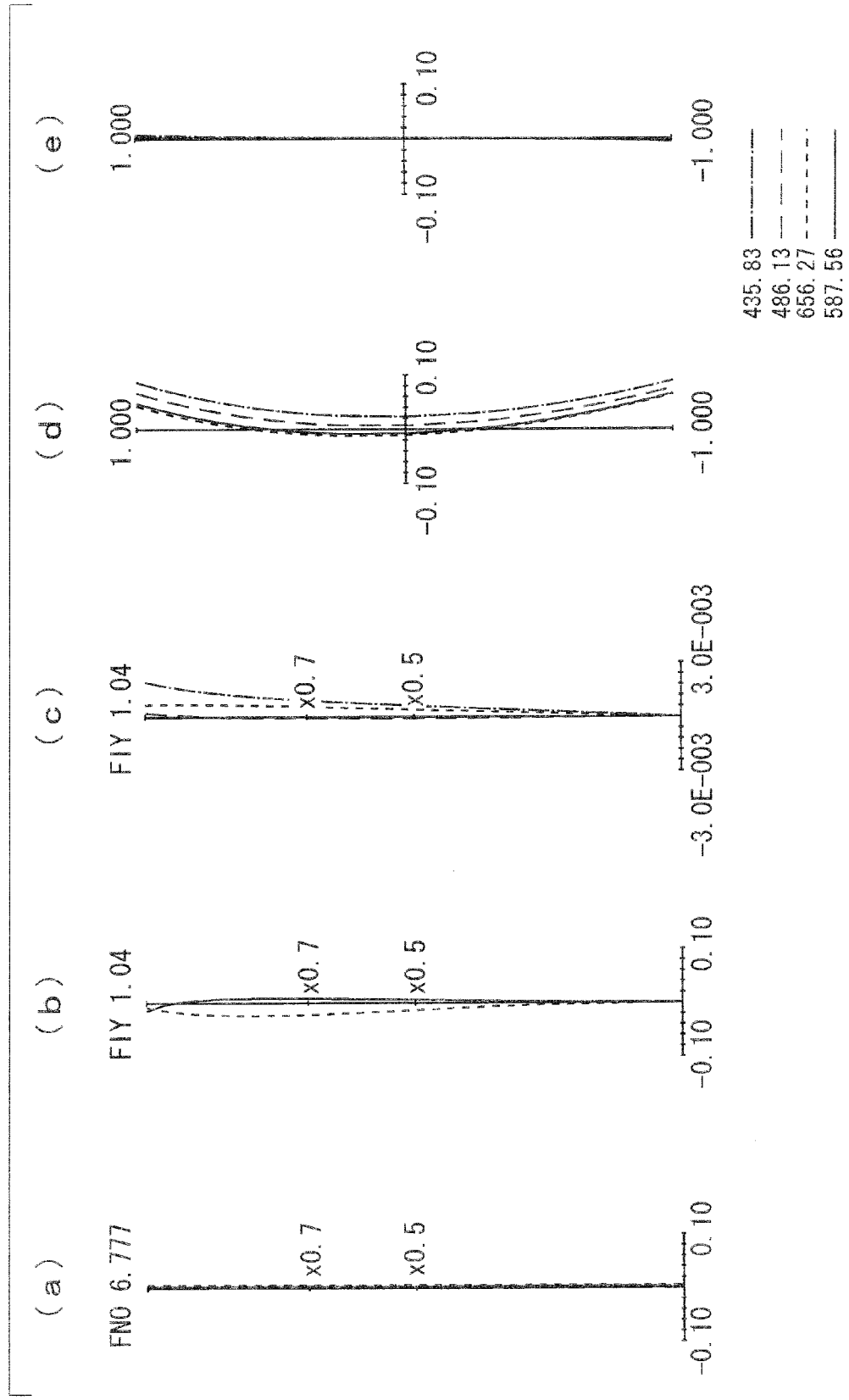
FIG. 15 includes aberration diagrams showing various kinds of aberrations of the objective lens in FIG. 14.

As shown in FIG. 14, an objective lens according to a seventh example has a configuration similar to that of the objective lens according to the first example. Lens data of the objective lens according to this example is shown below. FIG. 15 illustrates various aberration diagrams of the objective lens according to this example having the above-described configuration.

Eighth Example

| Lens Data | | | | |
|---|---|---|---|---|
| Surface No. | r | d | nd | ν |
| Object Surface | ∞ | 7.270 | 1.000 | |
| 1 | ∞ | 0.341 | 2.170 | 33.00 |
| 2 | 0.6666 | 0.435 | 1.000 | |
| 3 | 1.8334 | 1.044 | 1.762 | 26.52 |
| 4 | ∞ | 0.034 | 1.000 | |
| Stop | ∞ | 0.034 | 1.000 | |
| 6 | ∞ | 1.085 | 1.729 | 54.68 |
| 7 | −1.7541 | 0.237 | 1.000 | |
| 8 | 1.6554 | 1.426 | 1.729 | 54.68 |
| 9 | −1.1252 | 0.687 | 2.317 | 22.40 |
| 10 | −6.4900 | 0.610 | 1.000 | |
| 11 | ∞ | 1.554 | 1.516 | 64.14 |
| 12 | ∞ | 0.000 | 1.000 | |
| Image Surface | ∞ | 0.000 | | |

Figure 16:
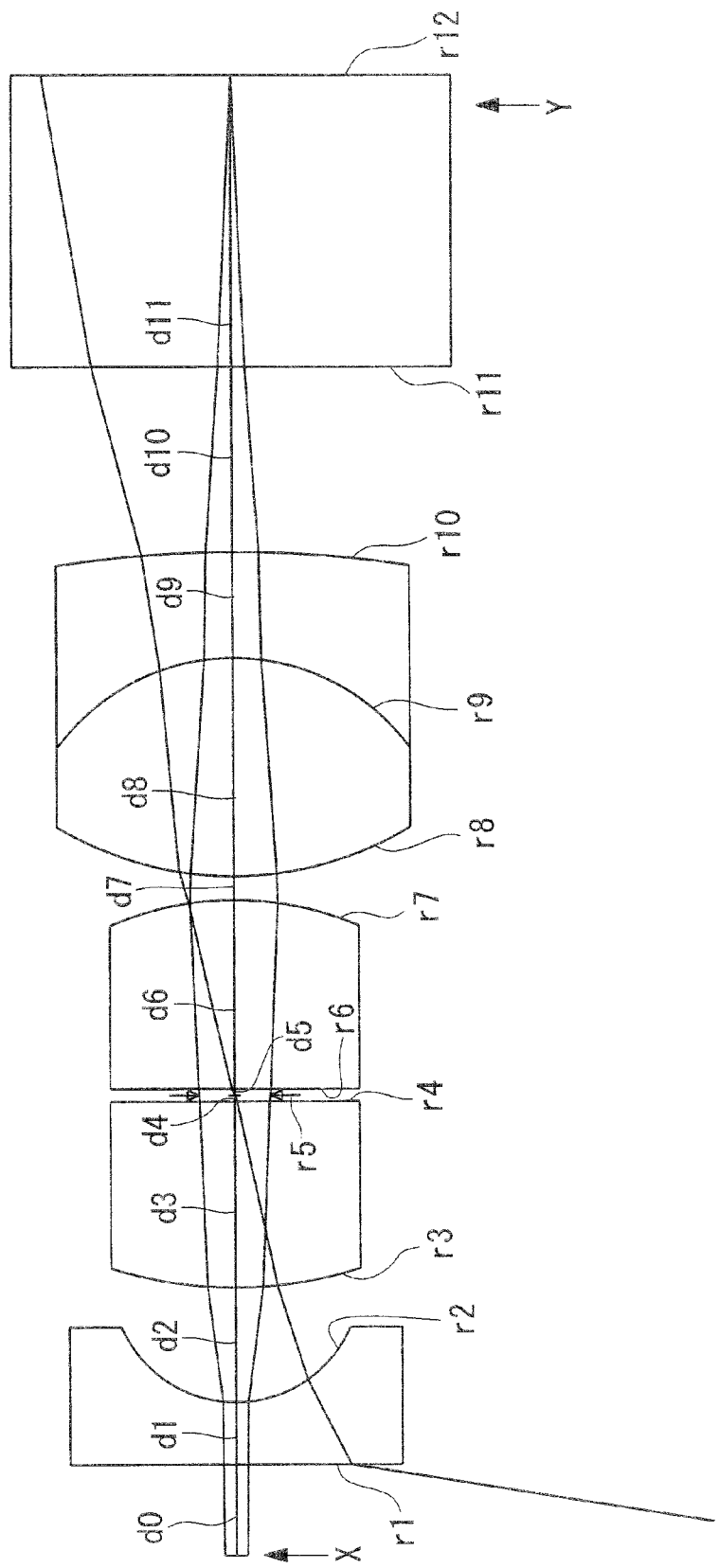
FIG. 16 is a cross-sectional view showing an objective lens according to an eighth example.
Figure 17:
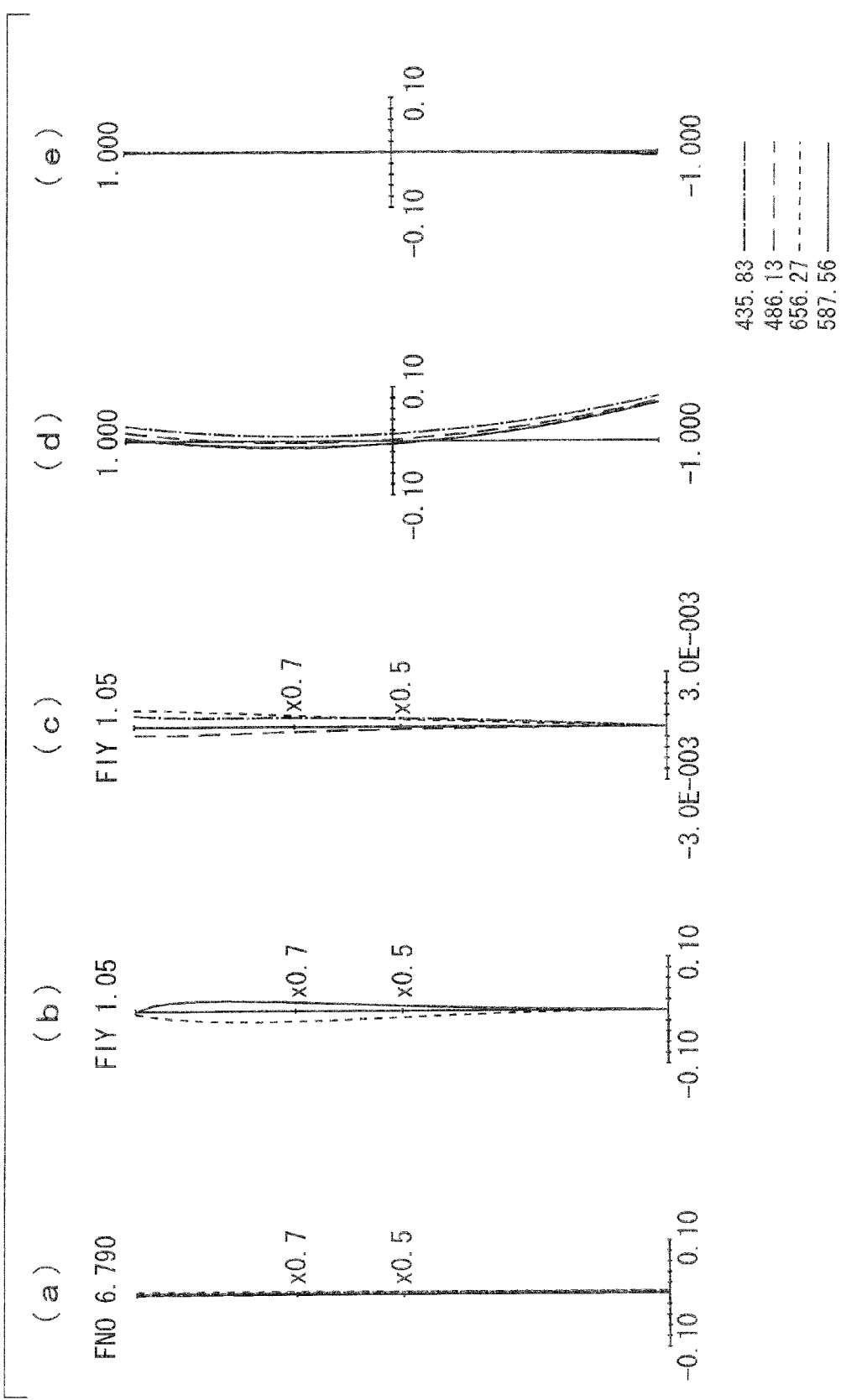
FIG. 17 includes aberration diagrams showing various kinds of aberrations of the objective lens in FIG. 16.

As shown in FIG. 16, an objective lens according to an eighth example has a configuration similar to that of the objective lens according to the first example. Lens data of the objective lens according to this example is shown below. FIG. 17 illustrates various aberration diagrams of the objective lens according to this example having the above-described configuration.

Ninth Example

| Lens Data | | | | |
|---|---|---|---|---|
| Surface No. | r | d | nd | ν |
| Object Surface | ∞ | 7.351 | 1.000 | |
| 1 | ∞ | 0.345 | 2.170 | 33.00 |
| 2 | 0.6895 | 0.630 | 1.000 | |
| 3 | 2.3214 | 1.021 | 1.847 | 23.78 |
| 4 | ∞ | 0.035 | 1.000 | |
| Stop | ∞ | 0.035 | 1.000 | |
| 6 | ∞ | 1.037 | 1.729 | 54.68 |
| 7 | −1.7547 | 0.131 | 1.000 | |
| 8 | 1.9105 | 1.189 | 1.729 | 54.68 |
| 9 | −1.2174 | 0.579 | 2.317 | 22.40 |
| 10 | −6.4282 | 1.006 | 1.000 | |
| 11 | ∞ | 1.571 | 1.516 | 64.14 |
| 12 | ∞ | 0.000 | 1.000 | |
| Image Surface | ∞ | 0.000 | | |

Figure 18:
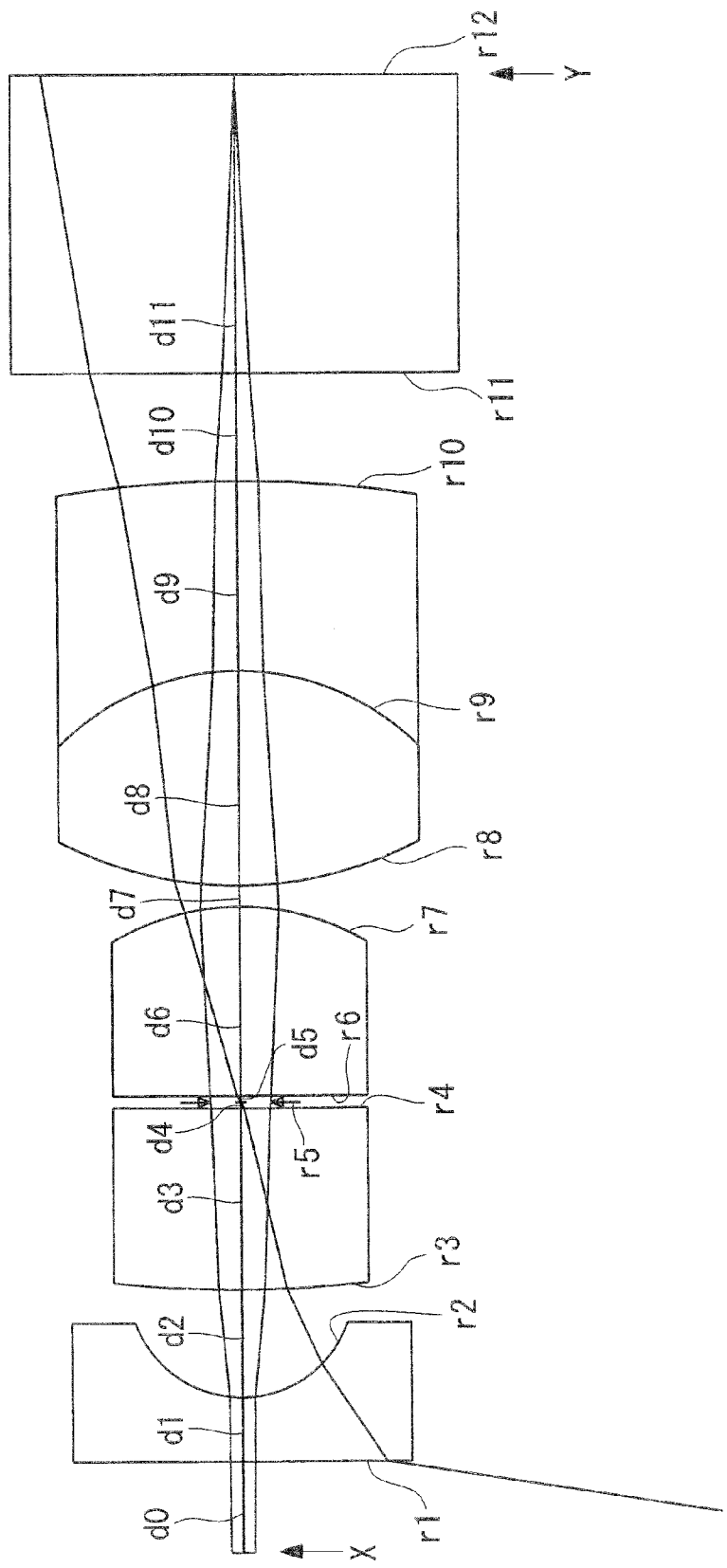
FIG. 18 is a cross-sectional view showing an objective lens according to a ninth example.
Figure 19:
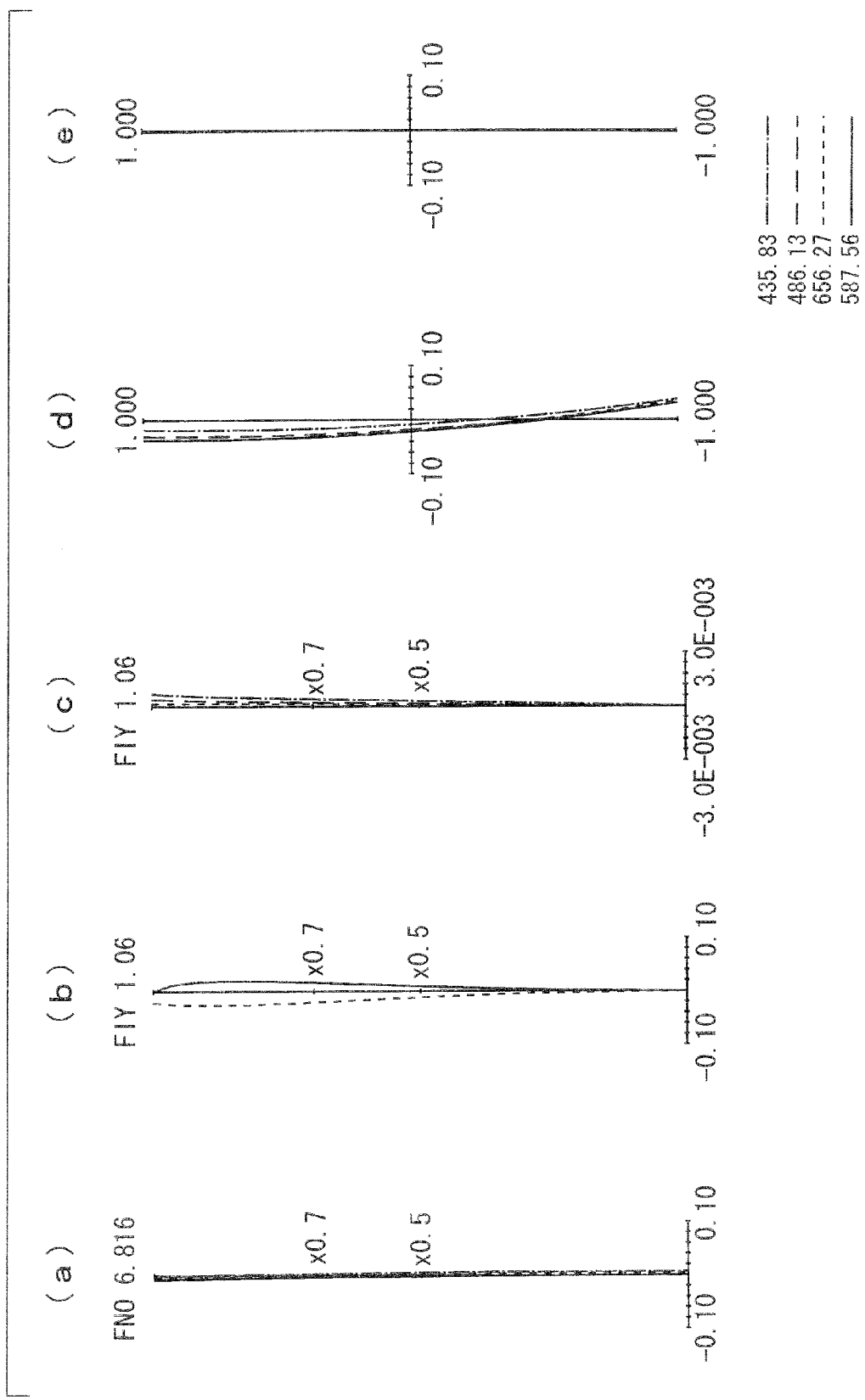
FIG. 19 includes aberration diagrams showing various kinds of aberrations of the objective lens in FIG. 18.

As shown in FIG. 18, an objective lens according to a ninth example has a configuration similar to that of the objective lens according to the first example. Lens data of the objective lens according to this example is shown below. FIG. 19 illustrates various aberration diagrams of the objective lens according to this example having the above-described configuration.

Tenth Example

| Lens Data | | | | |
|---|---|---|---|---|
| Surface No. | r | d | nd | ν |
| Object Surface | ∞ | 7.466 | 1.000 | |
| 1 | ∞ | 0.350 | 1.768 | 72.23 |
| 2 | 0.6203 | 0.588 | 1.000 | |
| 3 | 6.2504 | 0.989 | 2.054 | 27.80 |
| 4 | 40.3727 | 0.035 | 1.000 | |
| Stop | ∞ | 0.035 | 1.000 | |
| 6 | ∞ | 1.031 | 1.729 | 54.68 |
| 7 | −1.3807 | 0.115 | 1.000 | |
| 8 | 2.1475 | 1.166 | 1.729 | 54.68 |
| 9 | −1.4072 | 1.030 | 2.317 | 22.40 |
| 10 | −6.4805 | 0.582 | 1.000 | |
| 11 | ∞ | 1.596 | 1.516 | 64.14 |
| 12 | ∞ | 0.000 | 1.000 | |
| Image Surface | ∞ | 0.000 | | |

Figure 20:
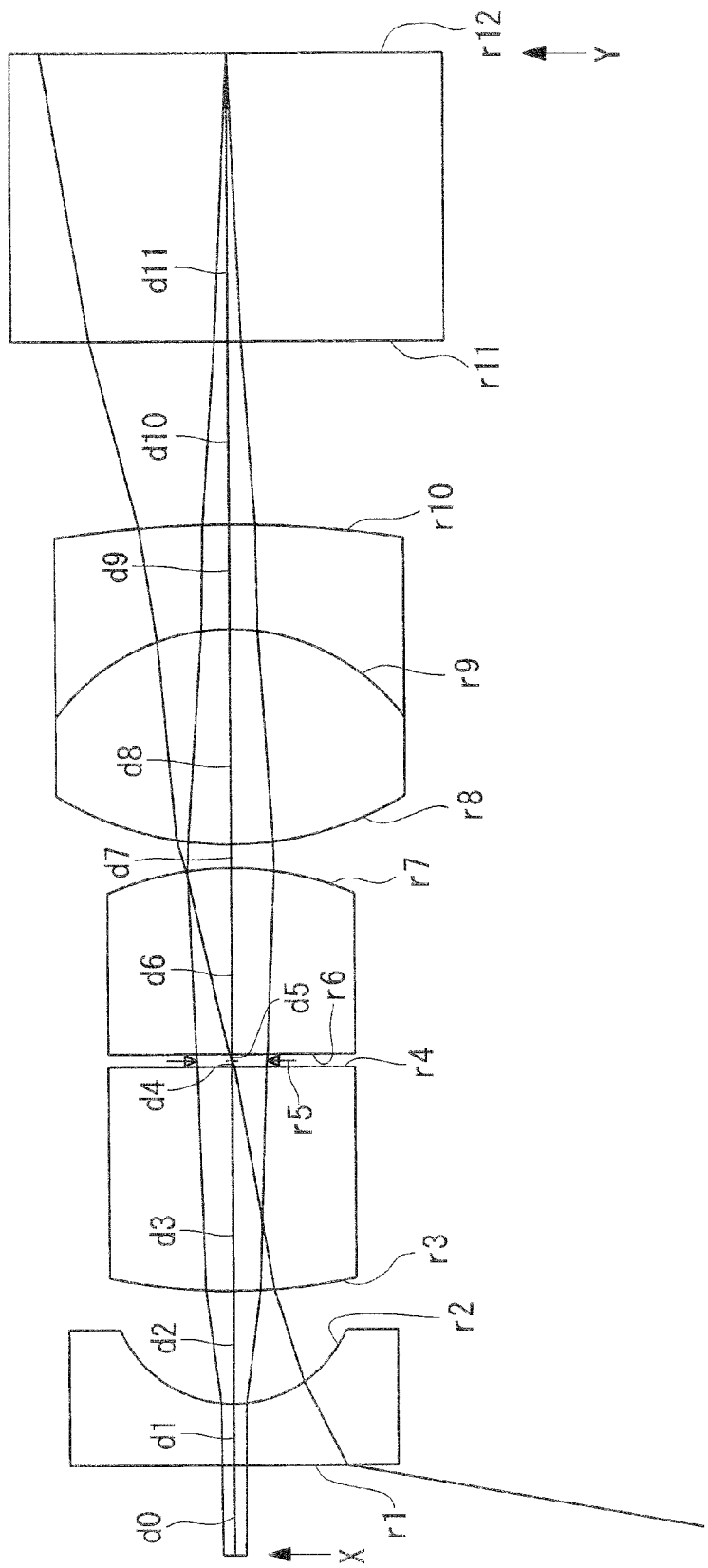
FIG. 20 is a cross-sectional view showing an objective lens according to a tenth example.
Figure 21:
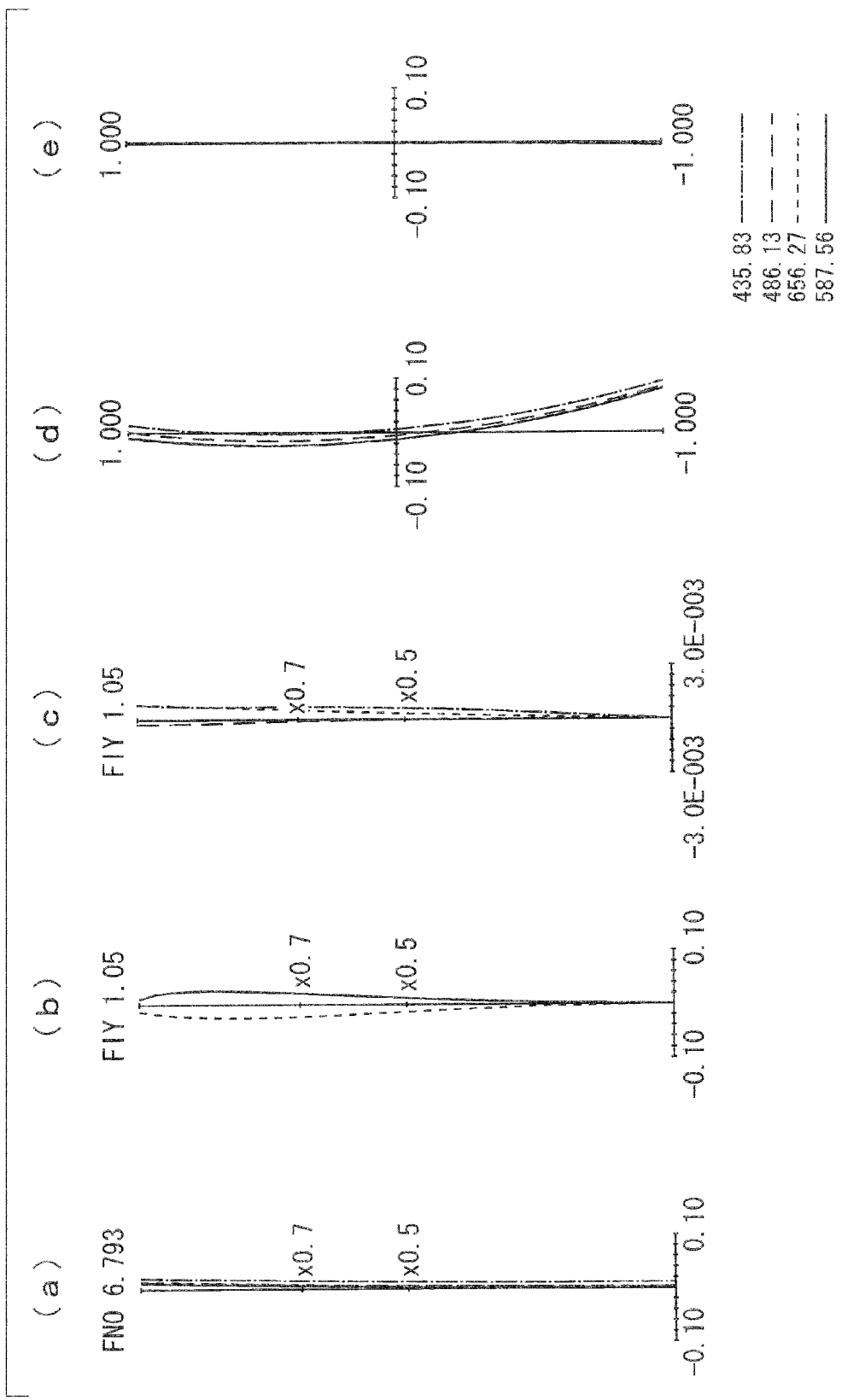
FIG. 21 includes aberration diagrams showing various kinds of aberrations of the objective lens in FIG. 20.

As shown in FIG. 20, an objective lens according to a tenth example has a configuration similar to that of the objective lens according to the first example. Lens data of the objective lens according to this example is shown below. FIG. 21 illustrates various aberration diagrams of the objective lens according to this example having the above-described configuration.

Eleventh Example

| Lens Data | | | | |
|---|---|---|---|---|
| Surface No. | r | d | nd | ν |
| Object Surface | ∞ | 7.348 | 1.000 | |
| 1 | ∞ | 0.344 | 2.170 | 33.00 |
| 2 | 0.6893 | 0.630 | 1.000 | |
| 3 | 3.4262 | 1.243 | 2.250 | 24.60 |
| 4 | ∞ | 0.034 | 1.000 | |
| Stop | ∞ | 0.034 | 1.000 | |
| 6 | ∞ | 1.036 | 1.729 | 54.68 |
| 7 | −1.7542 | 0.131 | 1.000 | |
| 8 | 1.9099 | 1.189 | 1.729 | 54.68 |
| 9 | −1.2166 | 0.578 | 2.317 | 22.40 |
| 10 | −6.4261 | 1.006 | 1.000 | |
| 11 | ∞ | 1.571 | 1.516 | 64.14 |
| 12 | ∞ | 0.000 | 1.000 | |
| Image Surface | ∞ | 0.000 | | |

Figure 22:
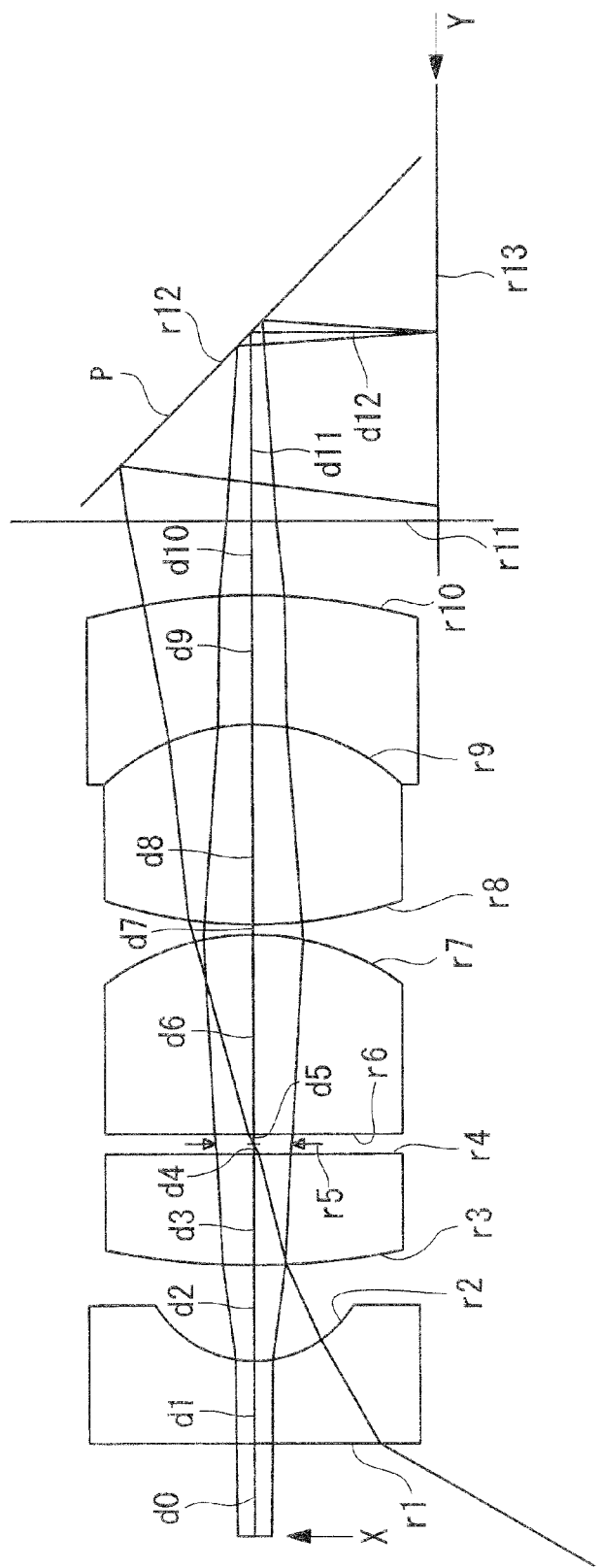
FIG. 22 is a cross-sectional view showing an objective lens according to an eleventh example.
Figure 23:
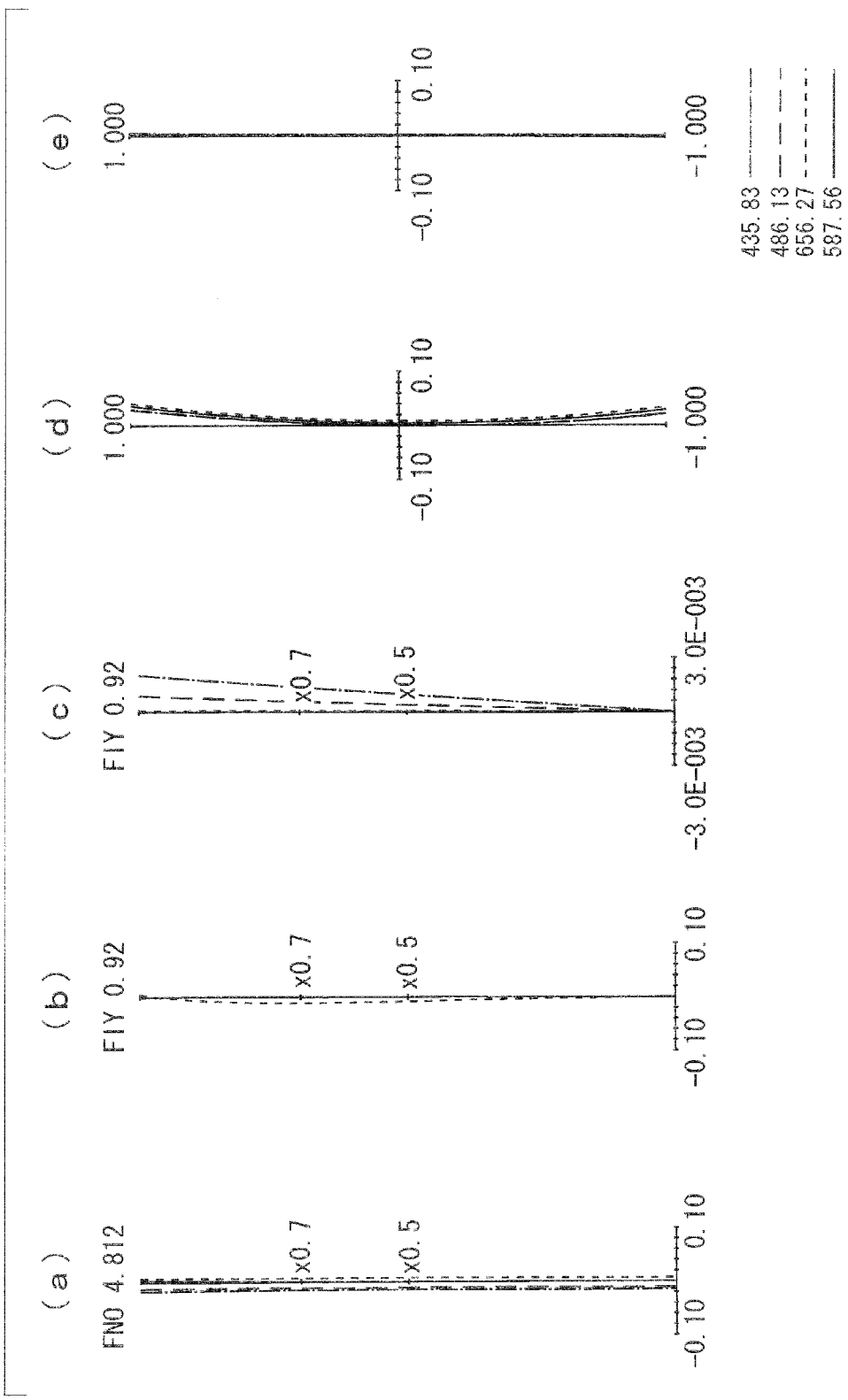
FIG. 23 includes aberration diagrams showing various kinds of aberrations of the objective lens in FIG. 22.

As shown in FIG. 22, an objective lens according to an eleventh example includes a prism (optical-path changing element) P in place of the cover glass in the objective lens according to the first example. Lens data of the objective lens according to this example is shown below. FIG. 23 illustrates various aberration diagrams of the objective lens according to this example having the above-described configuration.

| Lens Data | | | | |
|---|---|---|---|---|
| Surface No. | r | d | nd | ν |
| Object Surface | ∞ | 10.128 | 1.000 | |
| 1 | ∞ | 0.444 | 1.768 | 72.23 |
| 2 | 0.6240 | 0.513 | 1.000 | |
| 3 | 3.9849 | 0.599 | 1.923 | 18.90 |
| 4 | ∞ | 0.053 | 1.000 | |
| Stop | ∞ | 0.053 | 1.000 | |
| 6 | ∞ | 1.069 | 1.729 | 54.68 |
| 7 | −1.3363 | 0.053 | 1.000 | |
| 8 | 2.5462 | 1.069 | 1.729 | 54.68 |
| 9 | −1.1586 | 0.688 | 2.317 | 22.40 |

-continued

| Lens Data | | | | |
|---|---|---|---|---|
| Surface No. | r | d | nd | ν |
| 10 | −3.5304 | 0.778 | 1.000 | |
| 11 | 7.5104 | 0.631 | 1.516 | 64.14 |
| 12 | ∞ | 0.852 | 1.516 | 64.14 |
| 13 | ∞ | 0.000 | 1.000 | |
| Image Surface | ∞ | 0.000 | | |

Table 1 shows the values of conditional expressions (1) to (6) and the focal length of the entire system in each of the objective lenses according to the first to twelfth examples described above.

TABLE 1

| | a focal length of the entire | conditional expression (1) nn | conditional expression (2) (νp − νn) | conditional expression (3) (f23/f1) | conditional expression (4) n1 | conditional expression (5) n2 | conditional expression (6) (r3b + r3a)/(r3b − r3a) |
|---|---|---|---|---|---|---|---|
| example 1 | 1.000 | 2.317 | 32.28 | 1.547 | 1.768 | 1.923 | −1.0 |
| example 2 | 1.000 | 2.317 | 18.36 | 1.526 | 1.768 | 1.923 | −1.0 |
| example 3 | 1.000 | 2.100 | 24.68 | 1.556 | 1.768 | 1.923 | −1.0 |
| example 4 | 1.000 | 2.317 | 32.28 | 1.727 | 1.768 | 1.762 | −1.0 |
| example 5 | 1.000 | 2.317 | 32.28 | 1.669 | 1.883 | 1.762 | −1.0 |
| example 6 | 1.000 | 2.317 | 32.28 | 1.620 | 2.317 | 1.762 | −1.0 |
| example 7 | 1.000 | 2.317 | 32.28 | 1.643 | 2.170 | 1.762 | −1.0 |
| example 8 | 1.000 | 2.317 | 32.28 | 1.680 | 2.170 | 1.847 | −1.0 |
| example 9 | 1.000 | 2.317 | 32.28 | 1.727 | 1.768 | 2.054 | −1.0 |
| example 10 | 1.000 | 2.317 | 32.28 | 1.680 | 2.170 | 2.250 | −1.0 |
| example 11 | 1.000 | 2.317 | 32.28 | 1.547 | 1.768 | 1.923 | −1.0 |
| example 12 | 1.000 | 2.317 | 32.28 | 1.648 | 1.768 | 1.923 | −1.0 |

-continued

| Lens Data | | | | |
|---|---|---|---|---|
| Surface No. | r | d | nd | ν |
| 10 | −3.3144 | 0.396 | 1.000 | |
| 11 | ∞ | 1.000 | 1.516 | 64.14 |
| 12 | ∞ | 1.000 | 1.516 | 64.14 |
| 13 | ∞ | 0.000 | 1.000 | |
| Image Surface | ∞ | | | |

Twelfth Example

Figure 24:
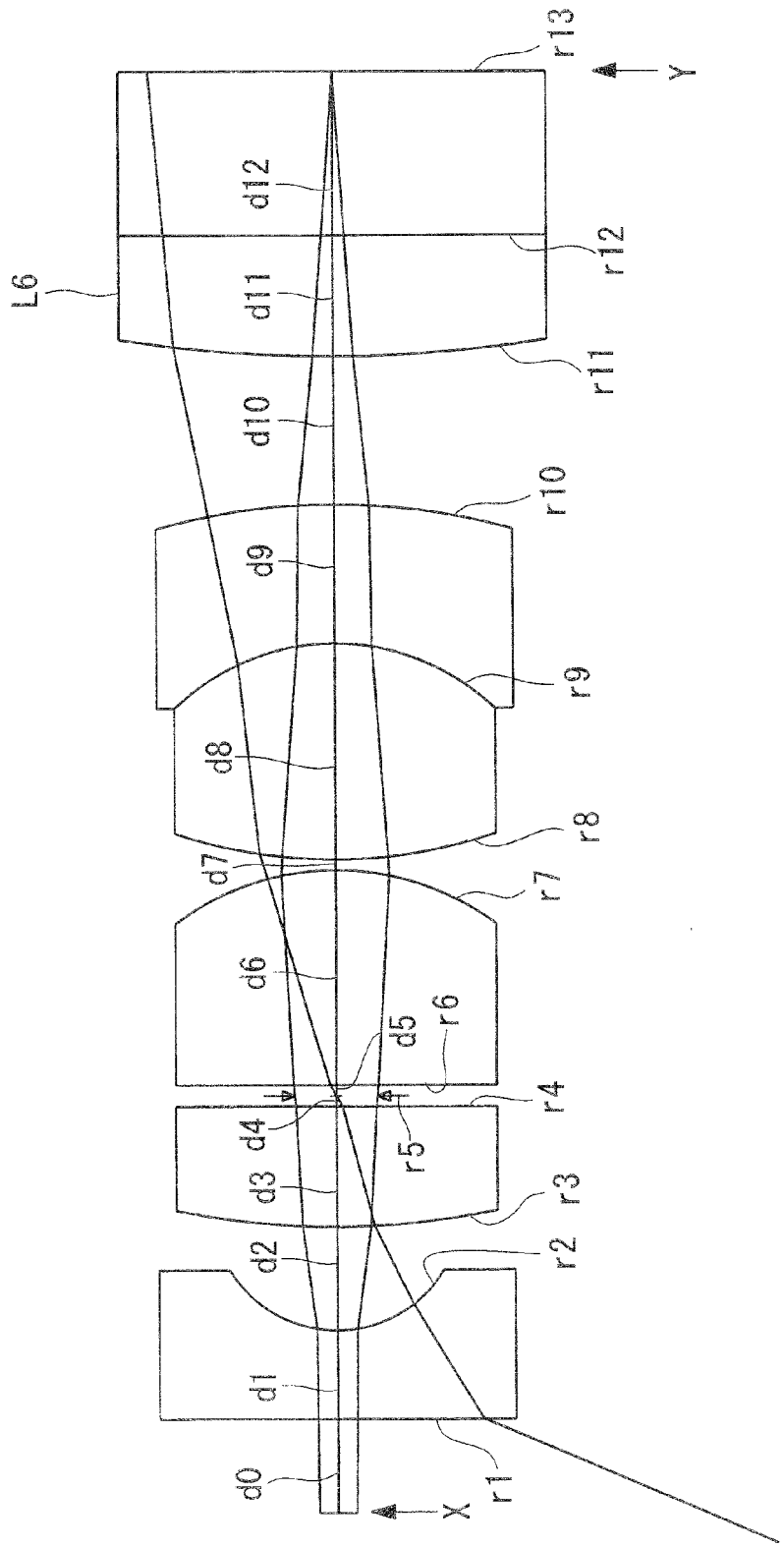
FIG. 24 is a cross-sectional view showing an objective lens according to a twelfth example.

As shown in FIG. 24, an objective lens according to a twelfth example includes a single positive lens L6 at the rear side of the joined lens in the objective lens according to the first example. Lens data of the objective lens according to this example is shown below. FIG. 25 illustrates various aberration diagrams of the objective lens according to this example having the above-described configuration.

| Lens Data | | | | |
|---|---|---|---|---|
| Surface No. | r | d | nd | ν |
| Object Surface | ∞ | 10.788 | 1.000 | |
| 1 | ∞ | 0.473 | 1.768 | 72.23 |
| 2 | 0.6646 | 0.547 | 1.000 | |
| 3 | 4.2445 | 0.638 | 1.923 | 18.90 |
| 4 | ∞ | 0.057 | 1.000 | |
| Stop | ∞ | 0.057 | 1.000 | |
| 6 | ∞ | 1.138 | 1.729 | 54.68 |
| 7 | −1.4233 | 0.057 | 1.000 | |
| 8 | 2.7121 | 1.138 | 1.729 | 54.68 |
| 9 | −1.2341 | 0.733 | 2.317 | 22.40 |

What is claimed is:

1. An objective lens comprising a first negative lens, a second positive lens, an aperture stop, a third positive lens, and a joined lens arranged in order from an object side, the joined lens being formed of a fourth positive lens and a fifth negative lens that are joined together, wherein the joined lens satisfies conditional expressions (1) and (2), and the objective lens satisfies conditional expression (3):

$$nn \geq 2.0 \quad (1)$$

$$12 < (\nu p - \nu n) < 34 \quad (2)$$

$$1.52 < (f23/fl) < 1.75 \quad (3)$$

where nn denotes a refractive index with respect to a d-line of the fifth lens, νp denotes an Abbe number of the fourth lens, νn denotes an Abbe number of the fifth lens, f23 denotes a combined focal length of the second lens and the third lens, and fl denotes a focal length of the entire system.

2. The objective lens according to claim 1, wherein the first lens satisfies conditional expression (4):

$$n1 \geq 2.0 \quad (4)$$

where n1 denotes a refractive index with respect to a d-line of the first lens.

3. The objective lens according to any one of claim 1, wherein the second lens satisfies conditional expression (5):

$$n2 \geq 2.00 \quad (5)$$

where n2 denotes a refractive index with respect to a d-line of the second lens.

4. The objective lens according to claim 1, wherein the third lens satisfies conditional expression (6):

$$(R3b+R3a)/(R3b-R3a) \geq -1.0 \qquad (6)$$

where $R3a$ denotes a radius of curvature of an object-side surface of the third lens, and $R3b$ denotes a radius of curvature of an image-side surface of the third lens.

5. The objective lens according to claim 1, further comprising at least one positive lens between a rear end of the joined lens and an image surface.

6. The objective lens according to claim 1, wherein at least the first lens is composed of a material having a tolerance to sterilization and/or a tolerance to chemicals, and wherein the material is sapphire, zirconia, yttrium-stabilized zirconia, synthetic quartz, light-transmissive YAG, or spinel.

7. The objective lens according to claim 1, further comprising an optical-path changing element between a rear end of the joined lens and an image surface.

8. An endoscope comprising the objective lens according to claim 1.

* * * * *